(12) United States Patent  
Kim

(10) Patent No.: US 12,270,771 B2
(45) Date of Patent: Apr. 8, 2025

(54) X-RAY INSPECTION DEVICE AND X-RAY INSPECTION SYSTEM

(71) Applicant: SEC CO., LTD., Suwon-si (KR)

(72) Inventor: Jong Hui Kim, Suwon (KR)

(73) Assignee: SEC CO., LTD., Suwon-Si (KR)

( * ) Notice: Subject to any disclaimer, the term of this patent is extended or adjusted under 35 U.S.C. 154(b) by 204 days.

(21) Appl. No.: 18/021,574

(22) PCT Filed: Sep. 14, 2020

(86) PCT No.: PCT/KR2020/012355
§ 371 (c)(1),
(2) Date: Feb. 16, 2023

(87) PCT Pub. No.: WO2022/045428
PCT Pub. Date: Mar. 3, 2022

(65) Prior Publication Data
US 2023/0304947 A1 Sep. 28, 2023

(30) Foreign Application Priority Data
Aug. 25, 2020 (KR) .................. 10-2020-0107098

(51) Int. Cl.
G01N 23/18 (2018.01)
B65G 47/90 (2006.01)
G01N 23/083 (2018.01)

(52) U.S. Cl.
CPC .......... *G01N 23/18* (2013.01); *B65G 47/902* (2013.01); *B65G 47/907* (2013.01); *G01N 23/083* (2013.01)

(58) Field of Classification Search
CPC .... B65G 47/902; B65G 47/907; G01N 23/18; G01N 23/083; G01V 5/22; G01V 5/223; G01V 5/226; G01V 5/232
See application file for complete search history.

(56) References Cited

U.S. PATENT DOCUMENTS

| 4,519,495 A * | 5/1985 | Bolli ...................... B65G 47/52 198/456 |
| 5,544,734 A * | 8/1996 | Gebhardt ............. B65G 47/902 198/457.03 |
| 6,480,002 B1 * | 11/2002 | Jung ................. H01M 10/0583 382/141 |

(Continued)

FOREIGN PATENT DOCUMENTS

| CN | 103179906 A | 6/2013 |
| CN | 104749198 A | 7/2015 |

(Continued)

OTHER PUBLICATIONS

Translation of KR-20180110905 (Year: 2018).*

(Continued)

*Primary Examiner* — Oluseye Iwarere
*Assistant Examiner* — Soorena Kefayati
(74) *Attorney, Agent, or Firm* — Frost Brown Todd LLP

(57) ABSTRACT

An X-ray inspection device is disclosed. The present X-ray inspection device includes an X-ray tube, a detector disposed so as to face the X-ray tube, and transfer devices, for simultaneous inspection of at least two objects to be inspected, transferring at least two objects to be inspected to an inspection position between the X-ray tube and the detector.

10 Claims, 27 Drawing Sheets

(56) References Cited

U.S. PATENT DOCUMENTS

| | | | | |
|---|---|---|---|---|
| 7,162,005 | B2* | 1/2007 | Bjorkholm | H01J 35/16 378/57 |
| 10,209,204 | B2* | 2/2019 | Mecke | G01N 23/04 |
| 10,274,636 | B2* | 4/2019 | Tang | G01V 5/226 |
| 10,809,210 | B2* | 10/2020 | Horiba | G01N 23/041 |
| 2002/0189205 | A1* | 12/2002 | Hart | B65B 5/101 53/540 |
| 2003/0048871 | A1* | 3/2003 | Greenbank | G01N 23/20025 378/68 |
| 2004/0057554 | A1 | 3/2004 | Bjorkholm | |
| 2005/0066628 | A1* | 3/2005 | Cerutti | B65G 47/52 53/542 |
| 2005/0074088 | A1* | 4/2005 | Ichihara | G01N 23/046 378/58 |
| 2008/0031717 | A1* | 2/2008 | Wild | B65G 47/918 414/736 |
| 2016/0083199 | A1* | 3/2016 | Nishizaka | B65G 47/905 414/800 |
| 2016/0207716 | A1* | 7/2016 | Yli-Piipari | B65G 43/00 |
| 2018/0189944 | A1* | 7/2018 | Kirschenman | G01N 23/223 |
| 2018/0281203 | A1* | 10/2018 | Shinomiya | B25J 15/0047 |
| 2019/0016541 | A1* | 1/2019 | Luo | C23C 14/246 |
| 2019/0329990 | A1* | 10/2019 | Leusink | B25J 15/026 |

FOREIGN PATENT DOCUMENTS

| | | |
|---|---|---|
| CN | 110049725 A | 7/2019 |
| JP | 2003139723 A | 5/2003 |
| JP | 2005534151 A | 11/2005 |
| JP | 2006170713 A | 6/2006 |
| JP | 2007147313 A | 6/2007 |
| JP | 2015127705 A | 7/2015 |
| JP | 2016533481 A | 10/2016 |
| JP | 2018124244 A | 8/2018 |
| JP | 2020188004 A | 11/2020 |
| KR | 100973689 B1 | 8/2010 |
| KR | 20150040096 A | 4/2015 |
| KR | 20150118492 A | 10/2015 |
| KR | 10-2016-0031812 A | 3/2016 |
| KR | 20160029306 A | 3/2016 |
| KR | 20180110905 A * | 10/2018 ........... G01N 23/083 |
| KR | 10-2019-0009150 A | 1/2019 |
| TW | 202018282 A | 5/2020 |
| WO | 2012048000 A2 | 4/2012 |
| WO | 2018096759 A1 | 5/2018 |
| WO | 2020222413 A1 | 11/2020 |

OTHER PUBLICATIONS

Office Action issued in Japanese Patent Application No. 2023-513695; dated Nov. 14, 2023; 7 pages, including English translation.

Inoue, Toru; Decision to Grant a Patent, issued in Japanese Patent Application No. 2023-513695; Feb. 27, 2024; 4 pages including English translation.

Int'l. Search Report, Korean Intellectual Property Office, Jul. 9, 2021, received in Application No. PCT/KR2020/012355, 11 pages, with English translation.

Written Opinion, Int'l. Searching Authority, Jul. 9, 2021, received in Int'l. Application No. PCT/KR2020/012355, 11 pages, with English translation.

Office Action issued by the Korean Patent Office for KR Patent Application No. 10-2020-0107098, Feb. 26, 2021, 10 pages, with English translation.

Notice of Decision to Refuse issued by the Korean Patent Office for KR Patent Application No. 10-2020-0107098, Jun. 15, 2021, 7 pages, with English translation.

Office Action issued by the Korean Patent Office for KR Patent Application No. 10-2021-0093076, Oct. 29, 2021, 9 pages, with English translation.

First Office Action; Chinese Pat. App. No. 202080103483.1; Oct. 21, 2024; 24 pages including English translation.

Savage, John; Extended European Search Report; European Pat. App. No. 20951660.8; Oct. 22, 2024; 8 pages.

* cited by examiner

X-RAY INSPECTION DEVICE AND X-RAY INSPECTION SYSTEM

TECHNICAL FIELD

The present disclosure relates to an X-ray inspection device and an X-ray inspection system, and more particularly, to an X-ray inspection device capable of effectively inspecting a plurality of objects to be inspected using one X-ray tube by rotating the objects to be inspected in various directions, and an X-ray inspection system including the X-ray inspection device.

BACKGROUND ART

X-ray has characteristics of forming a unique diffraction pattern for each crystal because its wavelength is as small as the size of an atom, having a strong fluorescence effect on materials because of its high energy, easily penetrating materials, and ionizing materials. When X-ray is transmitted, a transmittance changes according to the density or atoms of a material, and thus, energy colliding with a phosphor is different.

X-ray inspection devices using the principle may be divided into a medical X-ray inspection device photographing the inside of a living body and an industrial X-ray inspection device for non-destructive inspection used in general industries.

In particular, when an object to be inspected such as a secondary battery is produced in the industrial field, an X-ray inspection device is mainly used to inspect whether the object to be inspected is defective. In this case, in order to apply the X-ray inspection device to a secondary battery production line, the inspection speed of the X-ray inspection device must be equal to or higher than the production speed of the production line.

In the related art, in order to inspect a secondary battery, a plurality of X-ray tubes are sequentially used to capture three-dimensional (3D) inspection images of each part of the secondary battery. However, when a plurality of X-ray tubes are used, it takes a long time to capture an inspection image, and the overall structure of the X-ray inspection system is complicated.

DISCLOSURE

Technical Problem

The present disclosure is intended to solve the above problems, and provides an X-ray inspection device and an X-ray inspection system capable of reducing an inspection time by inspecting areas that need to be inspected which are simultaneously disposed at inspection positions with respect to a plurality of objects to be inspected using one X-ray tube, and reducing the overall size by simplifying the structure.

Technical Solution

An X-ray inspection device according to an embodiment of the present disclosure includes an X-ray tube, a detector disposed to face the X-ray tube, and transfer devices, for simultaneous X-ray inspection of at least two objects to be inspected, transferring the at least two objects to be inspected to an inspection position between the X-ray tube and the detector.

The transfer devices may include a first transfer device and a second transfer device.

Each of the first and second transfer devices may simultaneously transfer at least one object to be inspected to the inspection position.

The transfer devices may further include a rotation member simultaneously rotating the at least two objects to be inspected.

The rotation member may rotate the object to be inspected so that any one of corners or one of side surfaces of the object to be inspected is disposed at the inspection position.

The transfer devices may be capable of transferring an object to be inspected in a transfer direction perpendicular to an X-ray radiation path of the X-ray tube, may be rotatable with respect to the X-ray radiation path as an axis, and may be rotatable in a horizontal direction perpendicular to the X-ray radiation path and the transfer direction as an axis.

The transfer devices may include a first rotation member rotating the object to be inspected with respect to the X-ray radiation path as the axis, a second rotation member rotating the object to be inspected and the first rotation member in the horizontal direction as an axis, and a transfer member transferring the object to be inspected, the first rotation member, and the second rotation member in the transfer direction.

The transfer devices may further include a horizontal moving member moving the object to be inspected, the first rotation member, and the second rotation member in the horizontal direction.

The transfer device may further include a fixing member fixing the object to be inspected to the transfer device.

The X-ray inspection device may further include a carrier accommodating at least one object to be inspected, the transfer devices may transfer the carrier to the inspection position.

The X-ray inspection device may further include, when a plurality of objects to be inspected are accommodated in the carrier, a spacer disposed between each of the plurality of objects to be inspected.

The transfer devices may be implemented as articulated robots gripping the at least two objects to be inspected and rotating the at least two objects to be inspected through a plurality of joints.

The transfer devices may include a base, a plurality of links, a wrist portion having a gripper gripping the at least two objects to be inspected, and a plurality of joints sequentially connecting the base, the plurality of links, and the wrist portion, and connecting the plurality of links and the wrist portion so as to be rotatable, respectively.

The wrist portion may include a gripper gripping at least one object to be inspected.

The transfer devices may include a first transfer device, a second transfer device, and a third transfer device, and each of the first to third transfer devices may transfer at least one object to be inspected to the inspection position.

The detector may include a first detector; and a second detector, and the transfer device may transfer objects to be inspected to a first inspection position between the X-ray tube and the first detector and a second inspection position between the X-ray tube and the second detector, respectively.

An X-ray inspection system according to an embodiment of the present disclosure includes an X-ray tube, a detector disposed to face the X-ray tube, at least two carriers each capable of accommodating at least one object to be inspected, a loading device loading the object to be inspected on the carriers, a transfer device transferring the at least two carriers and the object to be inspected to an inspection position between the X-ray tube and the detector, and a carrier collecting device collecting the carriers to an initial position where the object to be inspected is loaded after the object to be inspected on which an X-ray inspection is completed is separated from the carrier, and the transfer device, for simultaneous X-ray inspection of objects to be inspected respectively accommodated in the at least two carriers, transfers the at least two carriers to an inspection position between the X-ray tube and the detector.

The transfer devices may include a first transfer device, and a second transfer device, and each of the first and second transfer devices may simultaneously transfer at least one object to be inspected to the inspection position.

The transfer device may further include a rotation member simultaneously rotating the at least two objects to be inspected.

The X-ray inspection system may include a first transport device loading a carrier in which an object to be inspected is accommodated on the transfer device, a classification device classifying the object to be inspected based on an X-ray inspection result of the object to be inspected, and a second transport device moving the carrier accommodating the object to be inspected on which the X-ray inspection is completed from the transfer device to the classification device.

The classification device may take out the object to be inspected on which the X-ray inspection is completed from the carrier collecting device.

The detector may generate an X-ray inspection image of the object to be inspected, and the classification device may classify and take out an object to be inspected into a line corresponding to an X-ray inspection result, based on the X-ray inspection image generated with respect to the object to be inspected.

The X-ray inspection system may further include a non-defective product classification line and a defective product classification line, and the classification device may arrange an object to be inspected identified as a non-defective product on the non-defective product classification line and arrange an object to be inspected identified as a defective product on the defective product classification line, based on the X-ray inspection image.

The X-ray inspection system may include, when a plurality of objects to be inspected are accommodated in the carrier, a spacer disposed between each of the plurality of objects to be inspected and a spacer collecting device collecting the spacer, and the classification device may take out spacers loaded on the carrier to the spacer collecting device, and the spacer collecting device may collect the spacers to a position where the spacers are loaded on the carrier.

13 is a diagram for explaining the operation of a transfer device according to an embodiment of the present disclosure.

Figure 14:
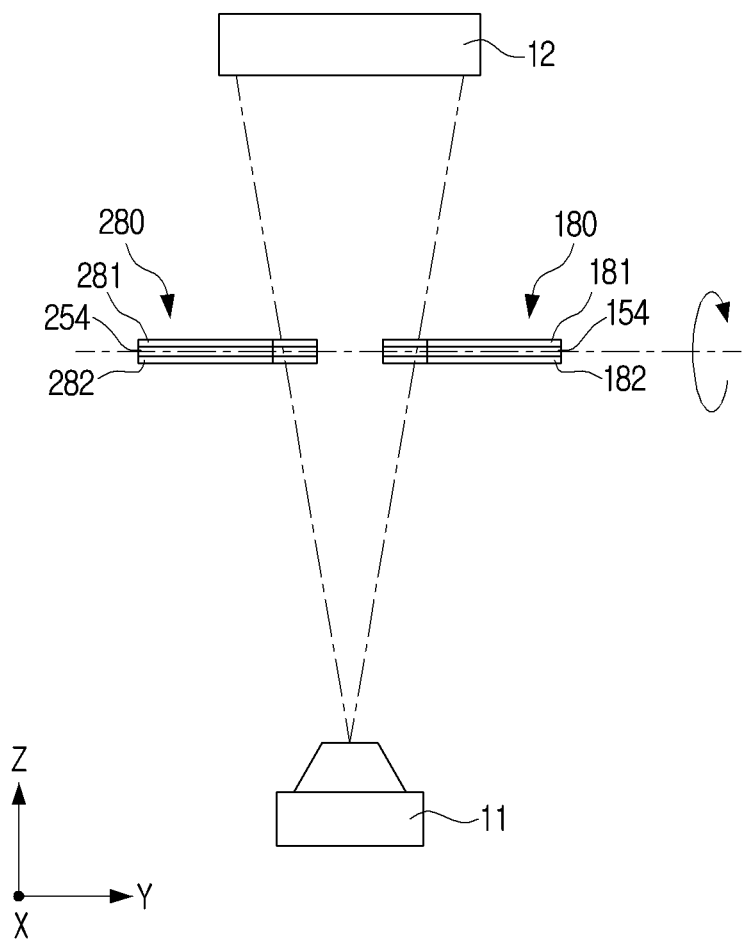

FIG. 14 is a diagram for explaining a secondary battery inspection operation of an X-ray inspection device according to an embodiment of the present disclosure.

Figure 15:
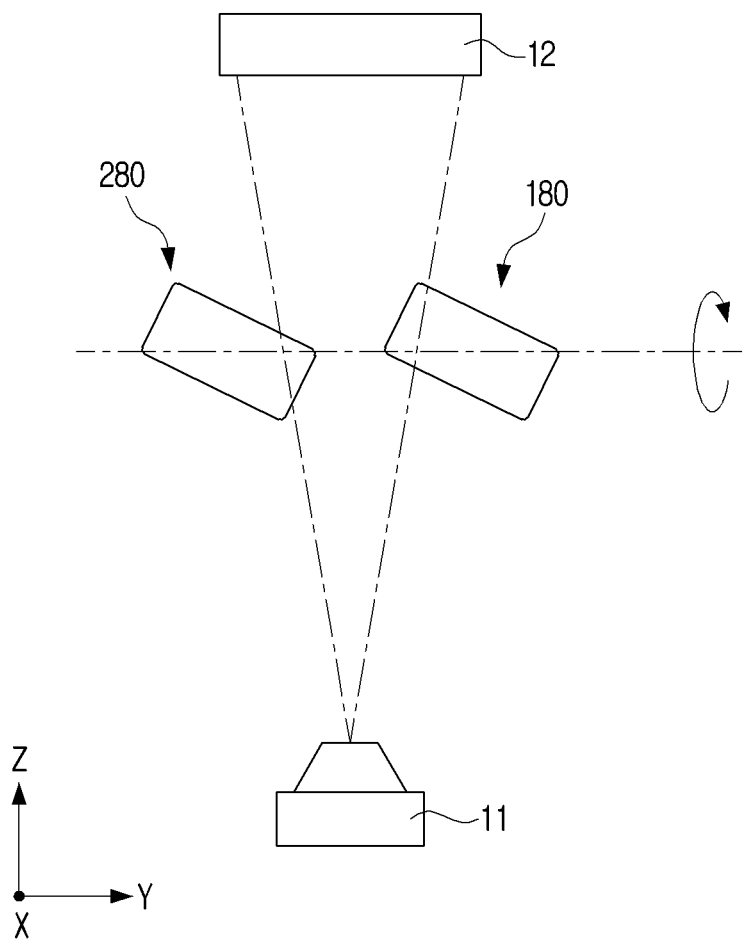

FIG. 15 is a diagram for explaining a secondary battery inspection operation of an X-ray inspection device according to an embodiment of the present disclosure.

Figure 16:
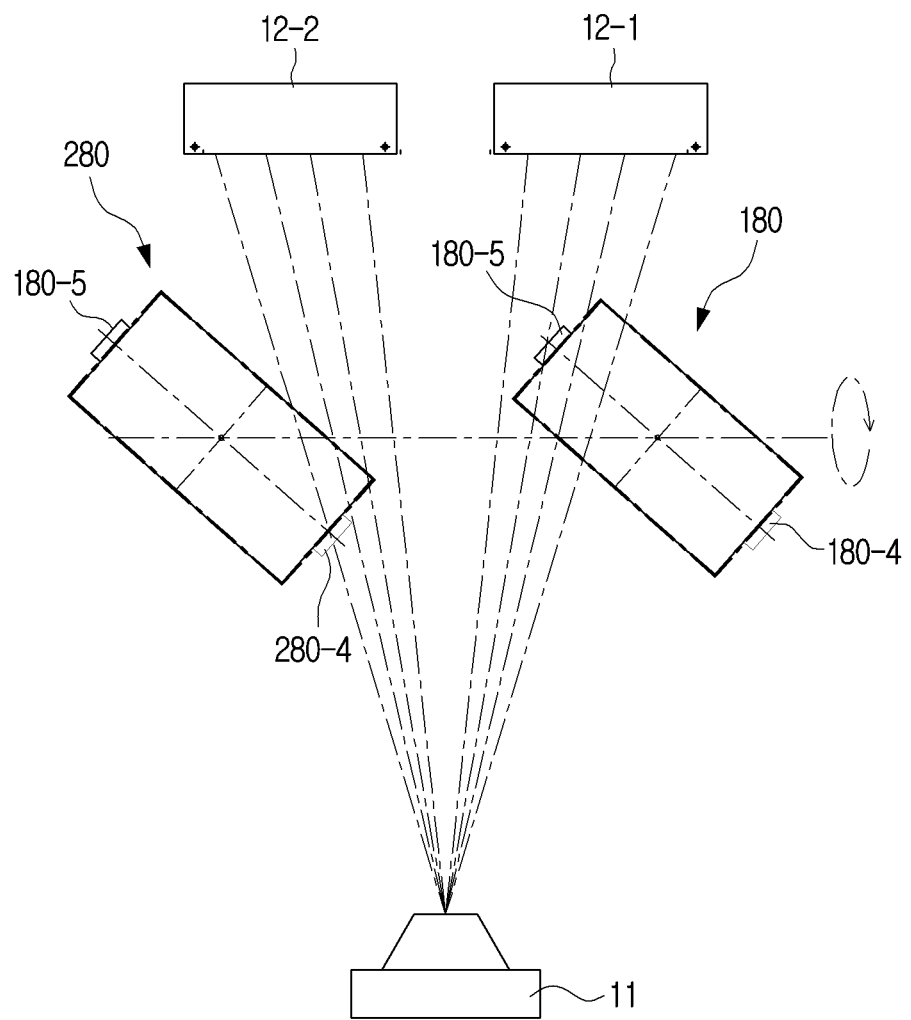

FIG. 16 is a diagram for explaining an inspection operation of an X-ray inspection device including a plurality of detectors.

Figure 17:
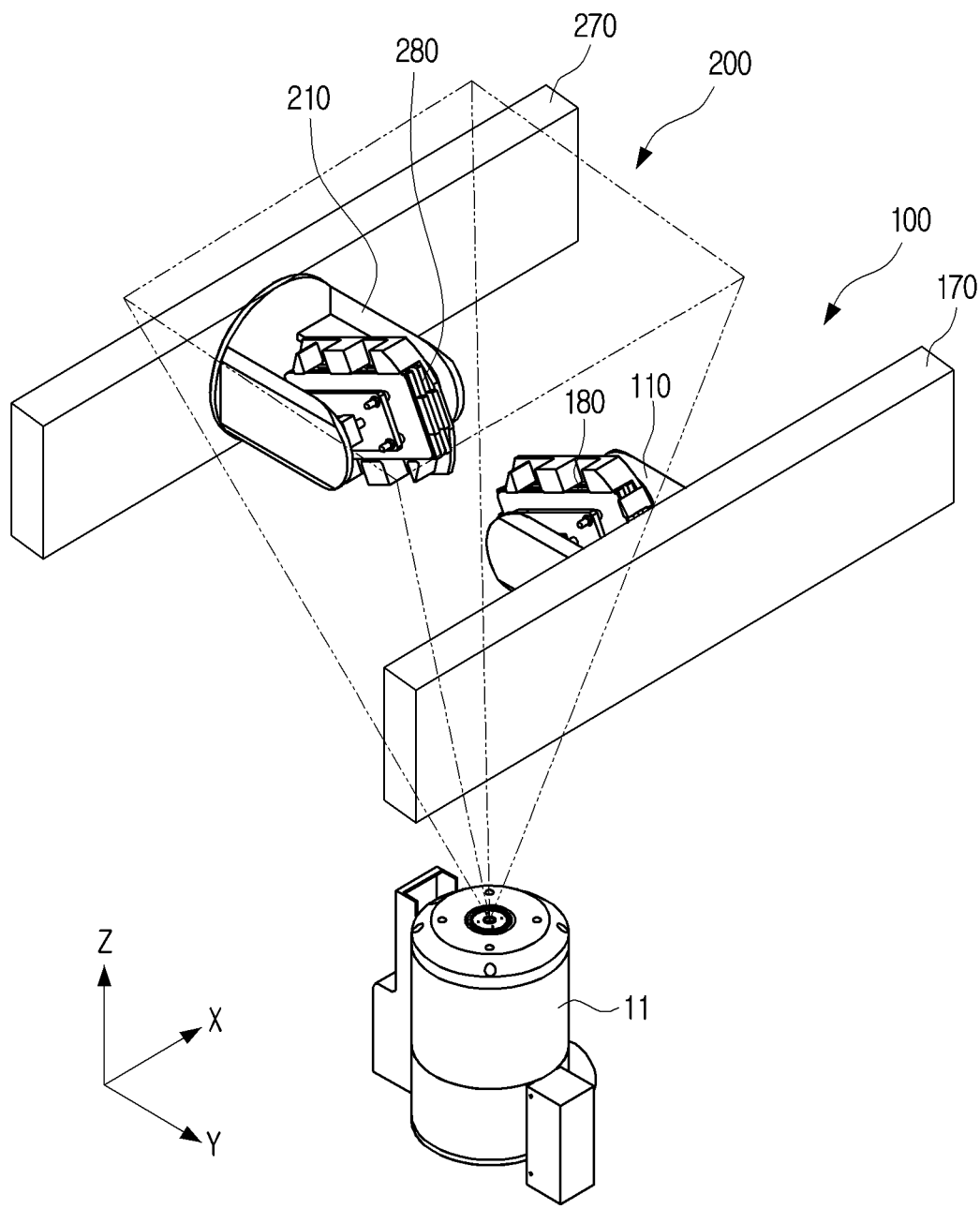

FIG. 17 is a diagram for explaining an inspection operation of an X-ray inspection device according to an embodiment of the present disclosure.

Figure 18:
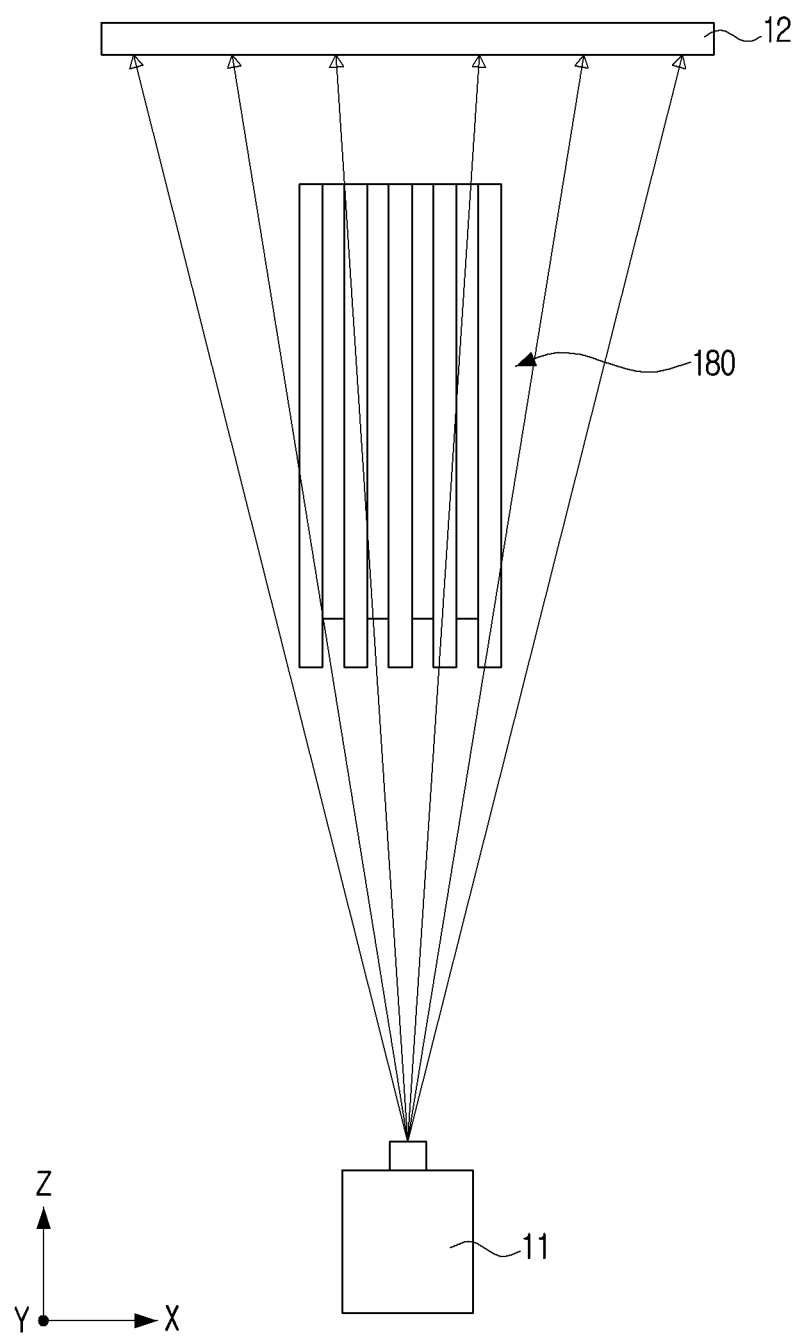

FIG. 18 is a side view illustrating a surface inspection method among inspection methods of an X-ray inspection device according to an embodiment of the present disclosure.

Figure 19:
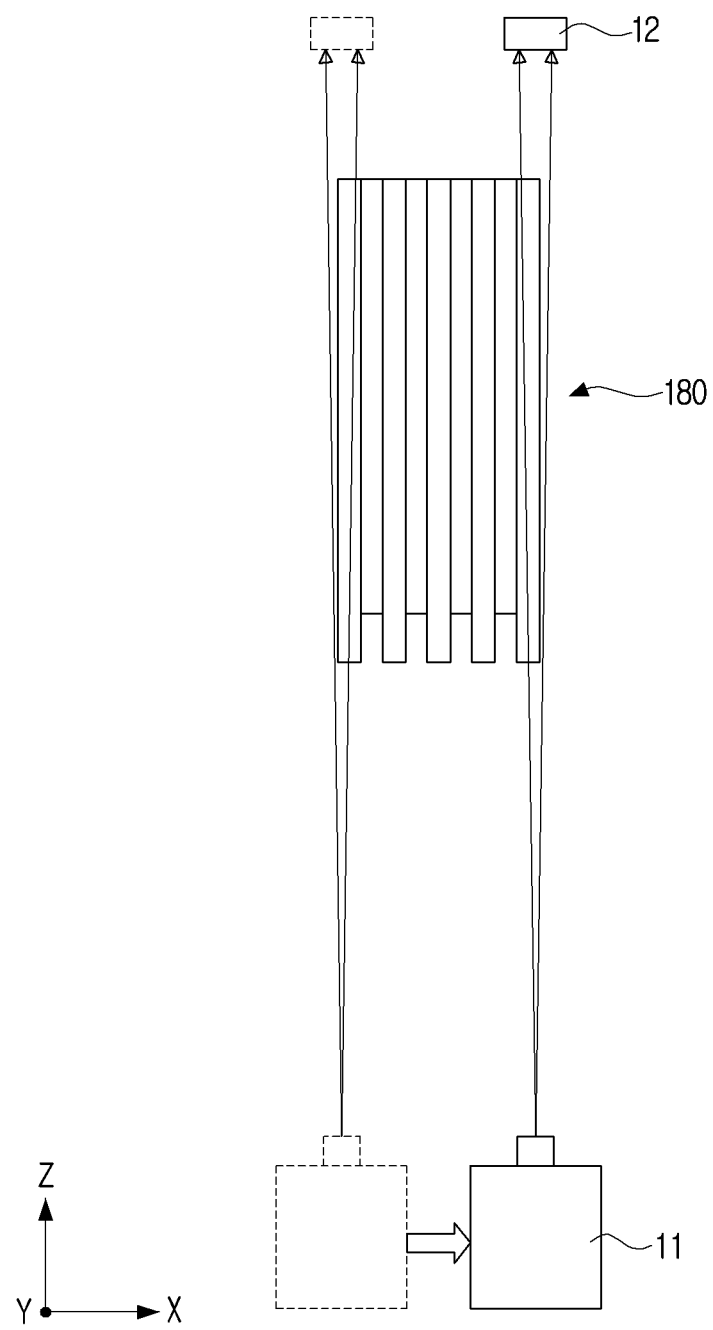

FIG. 19 is a side view illustrating a line inspection method among inspection methods of an X-ray inspection device according to an embodiment of the present disclosure.

Figure 20:
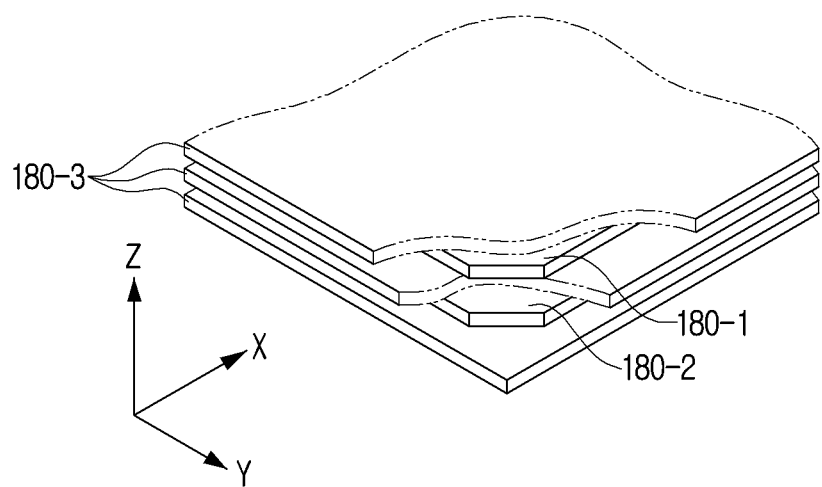

FIG. 20 is a diagram for explaining a secondary battery inspection operation of an X-ray inspection device according to an embodiment of the present disclosure.

Figure 21:
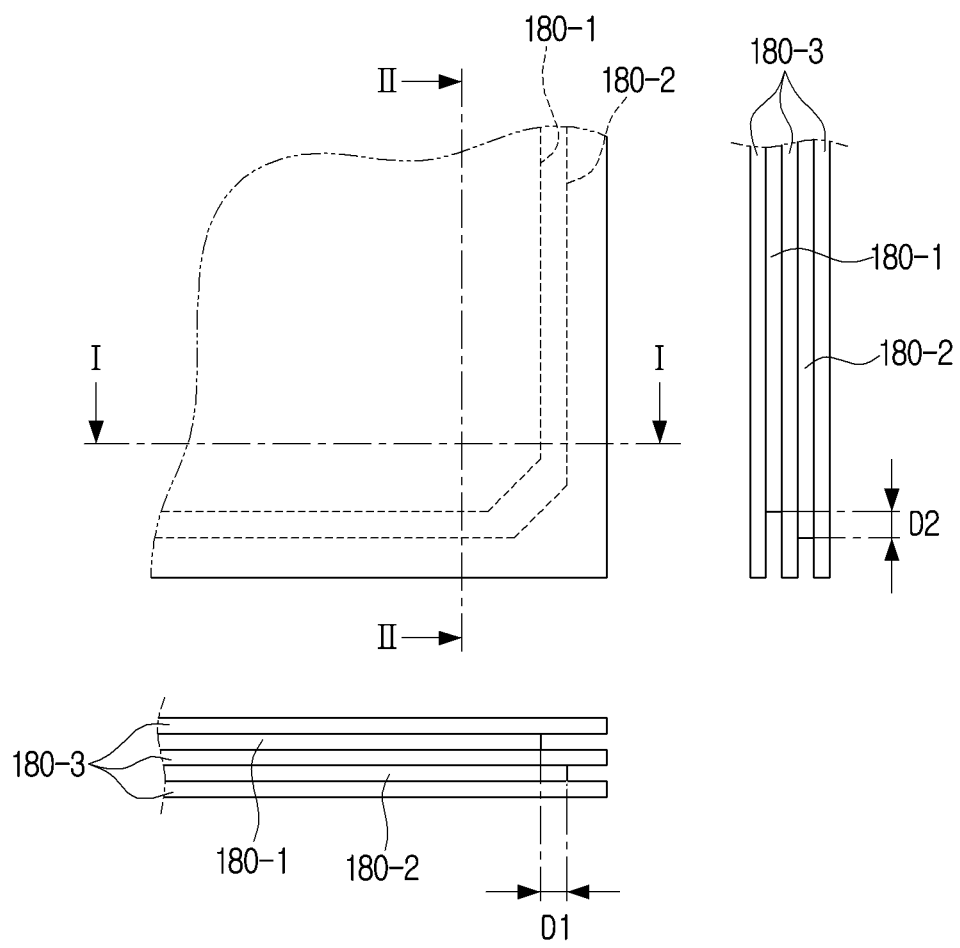

FIG. 21 is a diagram for explaining a secondary battery inspection operation of an X-ray inspection device according to an embodiment of the present disclosure.

Figure 22:
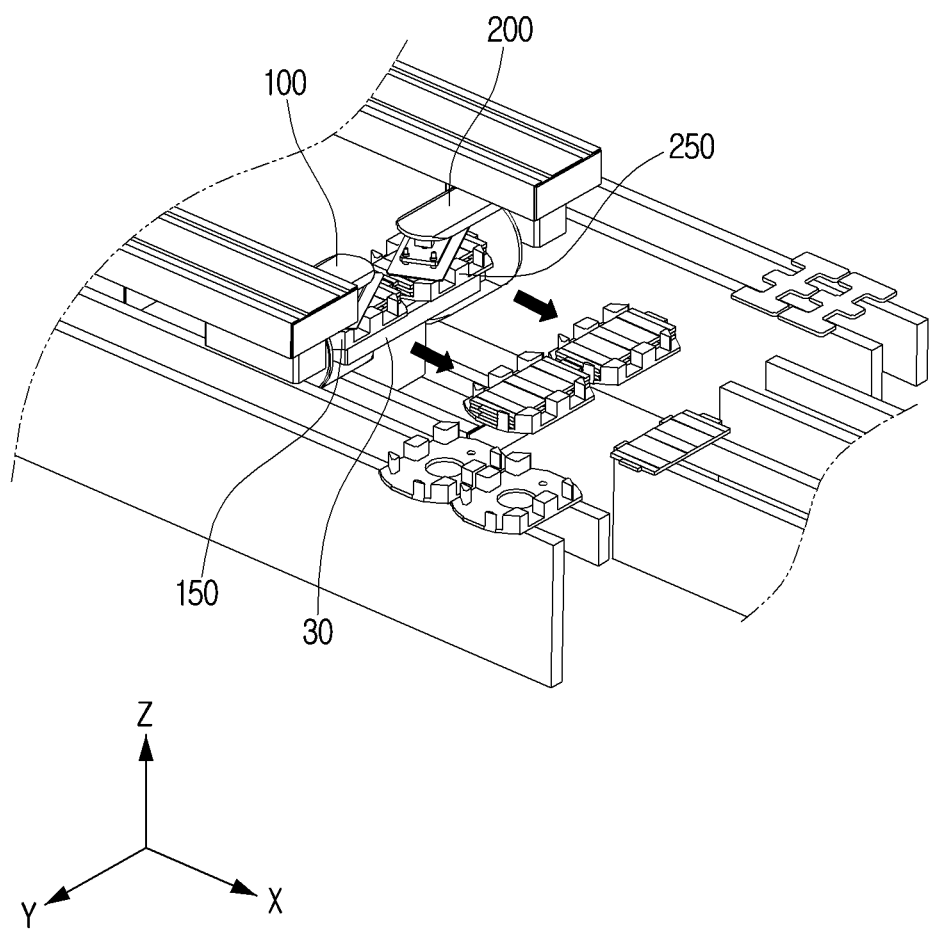

FIG. 22 is a perspective view for explaining the operation of a second transport device according to an embodiment of the present disclosure.

Figure 23:
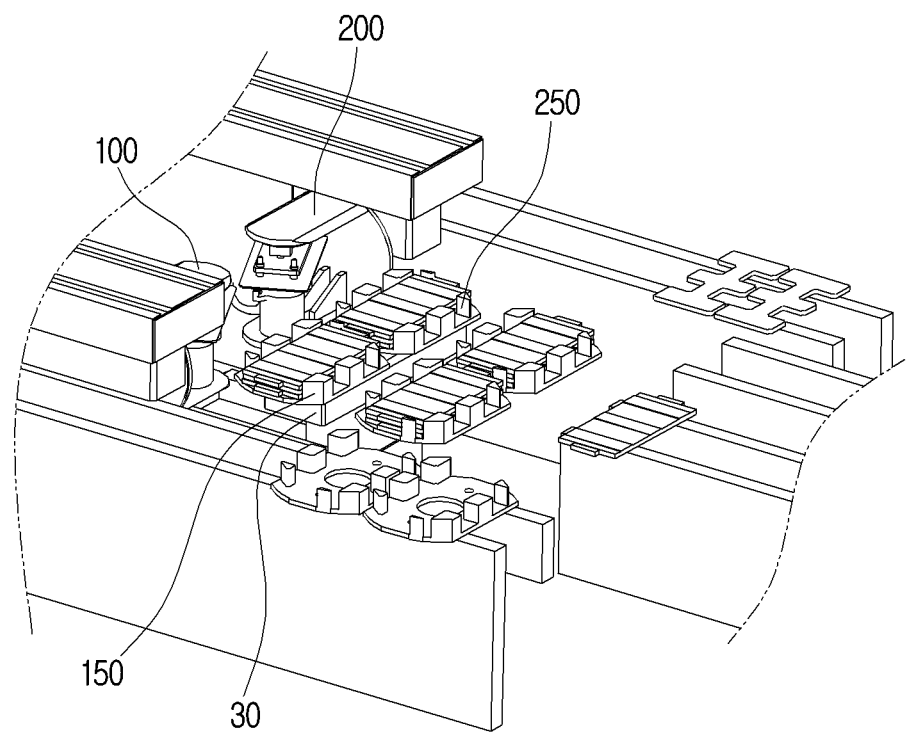

FIG. 23 is a perspective view for explaining the operation of a second transport device according to an embodiment of the present disclosure.

Figure 24:
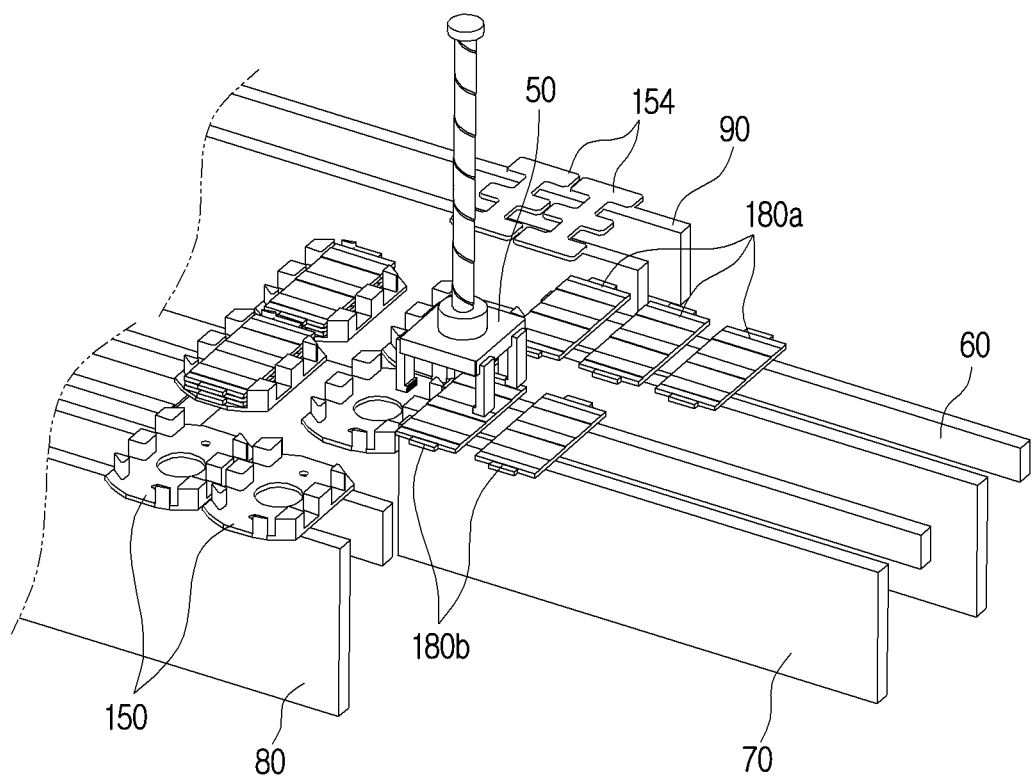

FIG. 24 is a perspective view for explaining the operation of a classification device according to an embodiment of the present disclosure.

Figure 25:
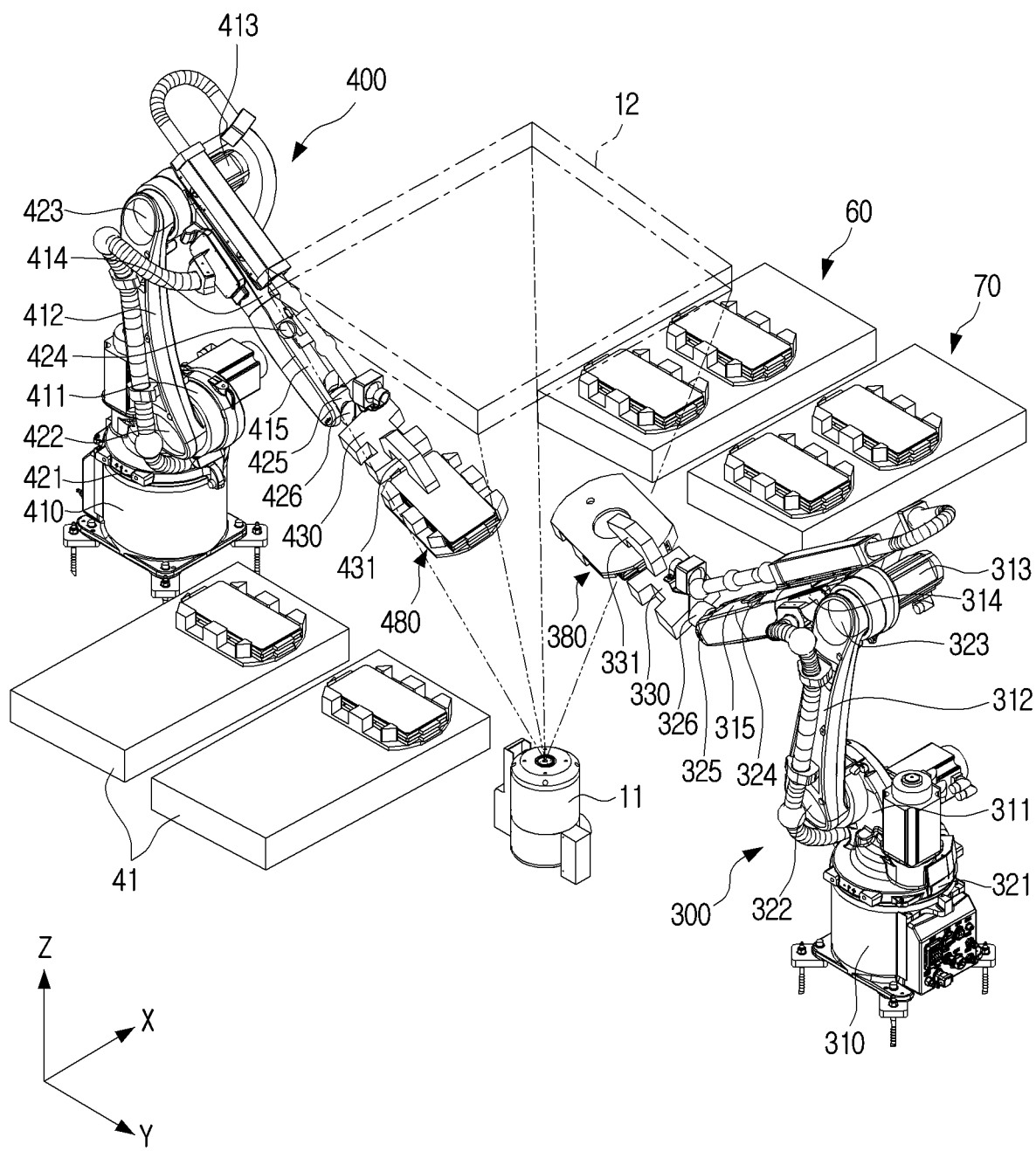

FIG. 25 is a diagram for explaining a transfer device according to another embodiment of the present disclosure.

Figure 26:
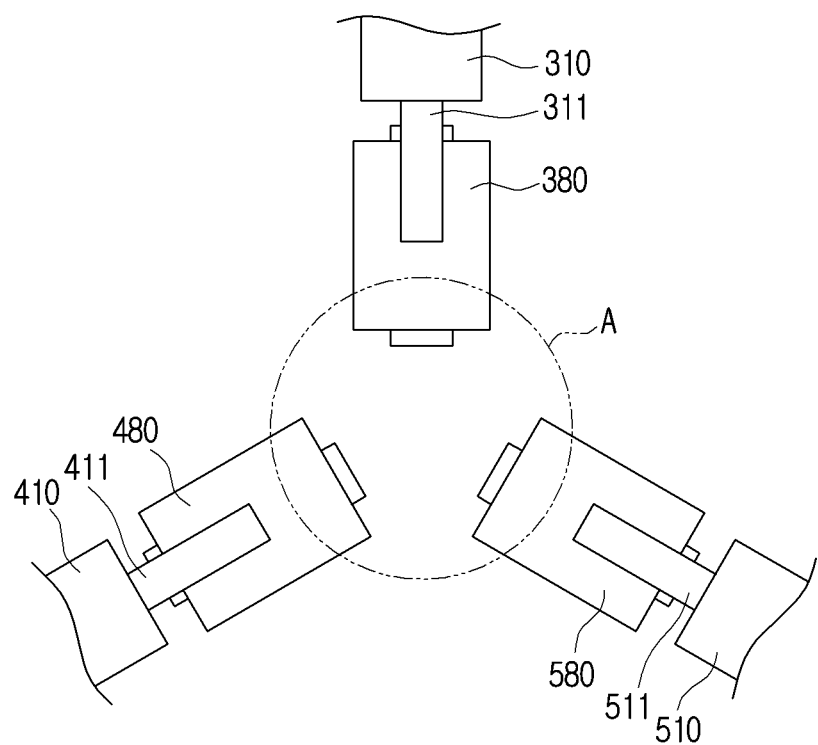

FIG. 26 is a diagram for explaining an inspection operation of an X-ray inspection device including a transfer device according to another embodiment of the present disclosure.

Figure 27:
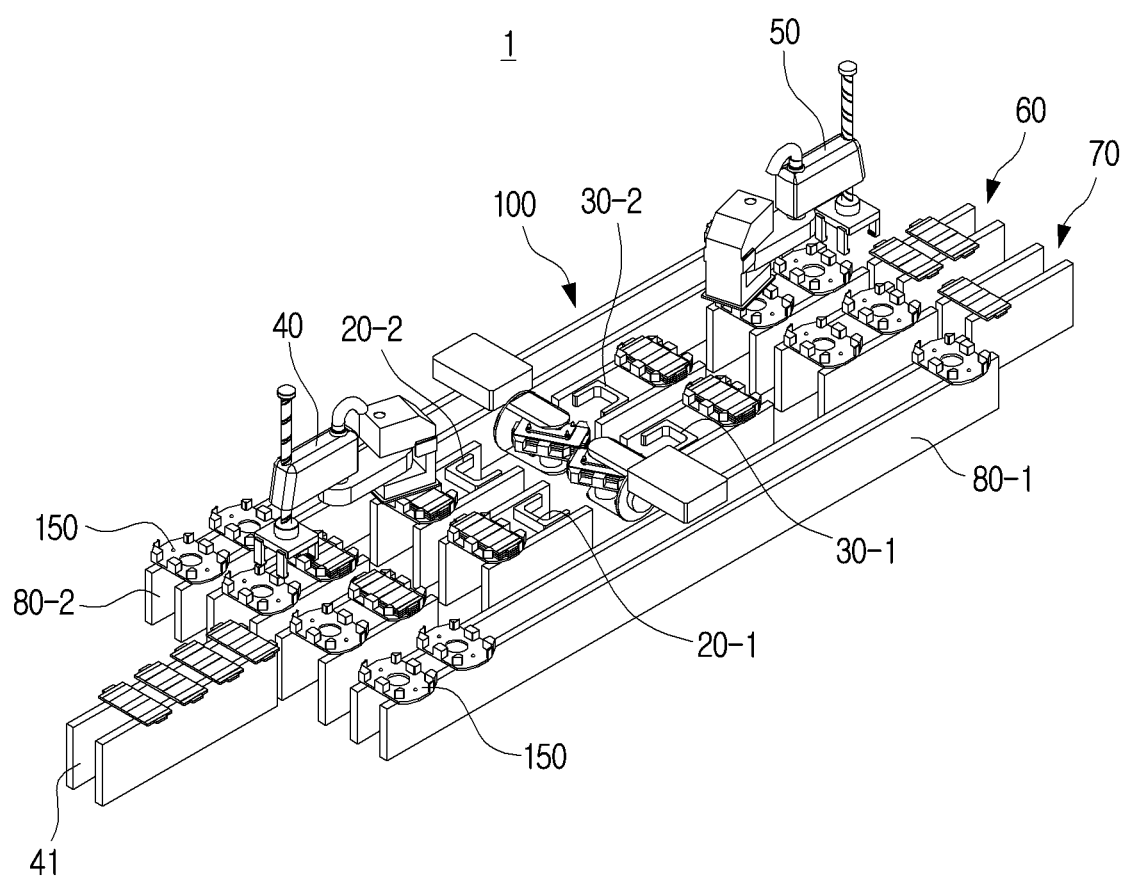

FIG. 27 is a perspective view illustrating an X-ray inspection system according to another embodiment of the present disclosure.

BEST MODE

Embodiments described below are shown by way of example to aid understanding of the present disclosure, and it should be understood that the present disclosure may be implemented with various modifications, differently from the embodiments described herein. However, in the following description of the present disclosure, when it is determined that a detailed description of a related known function or component may unnecessarily obscure the subject matter of the present disclosure, the detailed description and specific illustration thereof will be omitted. In addition, the accompanying drawings are not drawn to an actual scale to aid understanding of the disclosure, and the dimensions of some components may be exaggerated.

The terms used in the present specification and claims are general terms in consideration of the function of the present disclosure. However, these terms may vary according to the intention of a technician working in the pertinent field, legal or technical interpretation, and the emergence of new technologies. In addition, some terms are arbitrarily selected by the applicant. These terms may be interpreted as meanings defined in the present specification, and if there is no specific definition of terms, they may be interpreted based on the overall description of the present specification and common technical knowledge in the pertinent art.

In the description of the present disclosure, the order of each step should be understood as non-limiting, unless the preceding step must logically and temporally necessarily precede the succeeding step. In other words, except for the above exceptional cases, even if the process described as the following step is performed before the process described as the preceding step, the nature of the disclosure is not affected, and the scope of rights must also be defined regardless of the order of the steps.

In the present specification, expressions such as "has," "may have," "includes," or "may include" indicate the existence of a corresponding feature (e.g., a numerical value, a function, an operation, or a component such as a part), which does not preclude the existence of additional features.

Terms such as first and second may be used to describe various components, but the components should not be limited by the terms. The terms may only be used for the purpose of distinguishing one component from another. For example, a first component may be termed a second component, and similarly, the second component may be termed the first component, without departing from the scope of the present disclosure.

In addition, terms such as 'front surface', 'rear surface', 'upper surface', 'lower surface', 'side surface', 'left side', 'right side', 'upper portion', 'lower portion' used in the present disclosure are defined with respect to the drawings, and the shape and position of each component are not limited by the terms.

Also, since the components necessary for description of each embodiment of the present disclosure have been described in the present specification, the components are not necessarily limited thereto. Accordingly, some components may be changed or omitted, and other components may be added. In addition, components may be distributed and arranged in independent devices different from each other.

Furthermore, embodiments of the present disclosure will be described in detail with reference to the accompanying drawings and descriptions given in the accompanying drawings, but the present disclosure is not limited or restricted by the embodiments.

Hereinafter, the present disclosure will be described in detail with reference to FIGS. 1 to 27.

Figure 1:
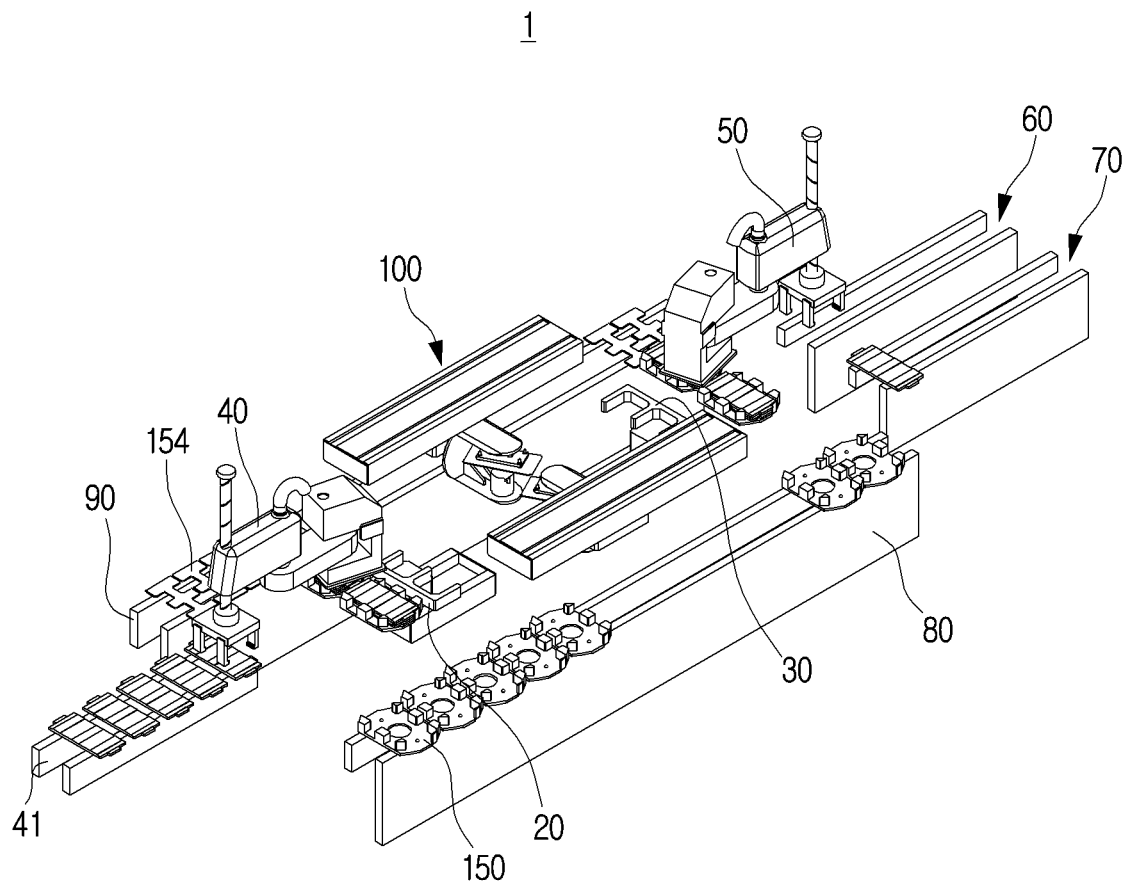
FIG. 1 is a perspective view schematically illustrating an X-ray inspection system according to an embodiment of the present disclosure.

FIG. 1 is a perspective view schematically illustrating an X-ray inspection system according to an embodiment of the present disclosure.

An X-ray inspection system 1 is a system that may perform a series of operations of transferring an object to be inspected to an inspection position, performing an X-ray inspection on the object to be inspected, and classifying non-defective and defective products based on inspection results in order to perform a non-destructive inspection on the object to be inspected.

Referring to FIG. 1, the X-ray inspection system 1 according to an embodiment of the present disclosure may include an X-ray inspection device 10 including an X-ray tube 11 (see FIG. 9), a detector 12 (see FIG. 9), and a transfer device 100, a supply line 41 supplying objects to be inspected from the outside, a loading device 40 loading the supplied objects to be inspected on a carrier 150, a first transport device 20 transferring the carrier 150 accommodating the objects to be inspected to the transfer device 100, a second transport device 30 moving the objects to be inspected on which the X-ray inspection has been completed from the transfer device 100 to a classification device 50, the classification device 50 classifying the objects to be inspected on which the X-ray inspection has been completed, a non-defective product classification line 60 from which objects to be inspected classified as non-defective products are taken, a defective product classification line 70 from which objects to be inspected classified as defective products are taken, and a carrier collecting device 80 and a spacer collecting device 90 respectively moving the carrier 150 and a spacer 154 to circulate in the X-ray inspection system 1.

The configuration transporting the logistics such as the supply line 41, the first transport device 20, the second transport device 30, the non-defective product classification line 60, the defective product classification line 70, the carrier collecting device 80 and the spacer collecting device 90 may be implemented with a conveyor system, a linear motion system (LMS), a magnet motion, a multi carrier system (MCS) or another linear actuator.

The transfer device 100 is a device capable of transporting an object to be inspected to be disposed in an X-ray radiation path of the X-ray tube 11 and rotating the object to be inspected in a plurality of directions, and through this operation, the X-ray inspection device 10 may generate a 3D inspection image of the object to be inspected. A detailed description of the X-ray inspection device 10 including the transfer device 100 will be given below with reference to FIGS. 8 to 13.

Hereinafter, each component included in the X-ray inspection system 1 according to various embodiments of the present disclosure will be described in detail with reference to FIGS. 2 to 21.

Figure 2:
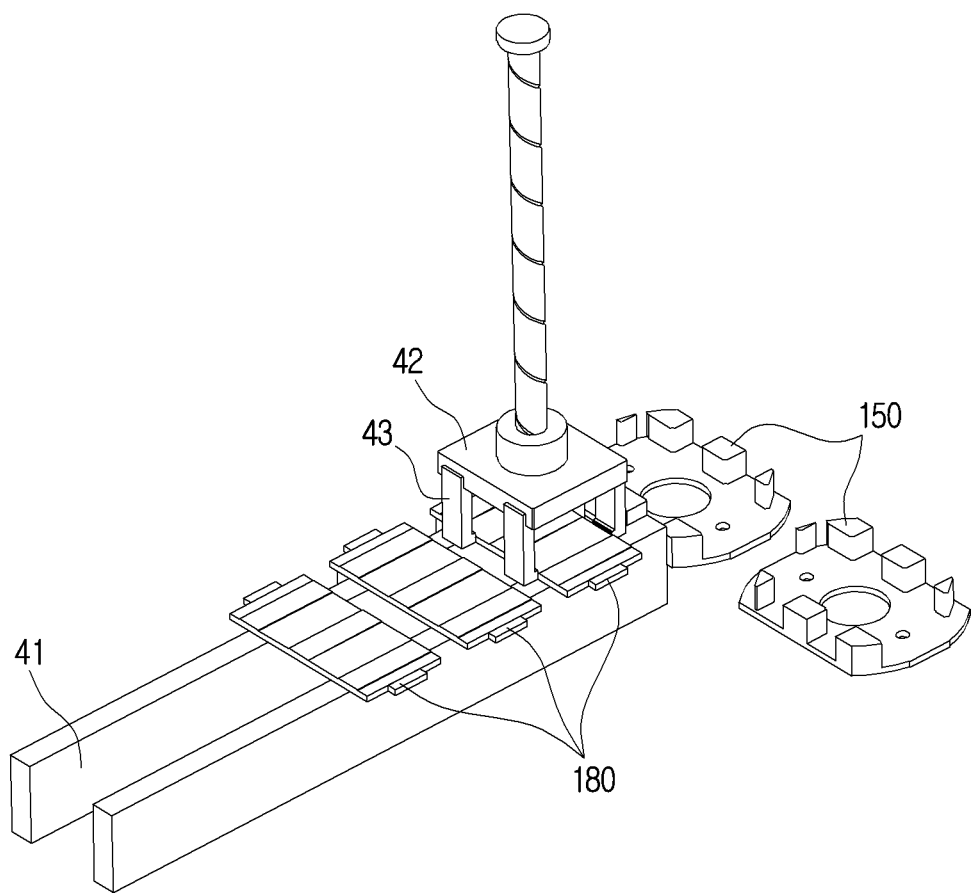
FIG. 2 is a perspective view for explaining a loading device according to an embodiment of the present disclosure.
Figure 3:
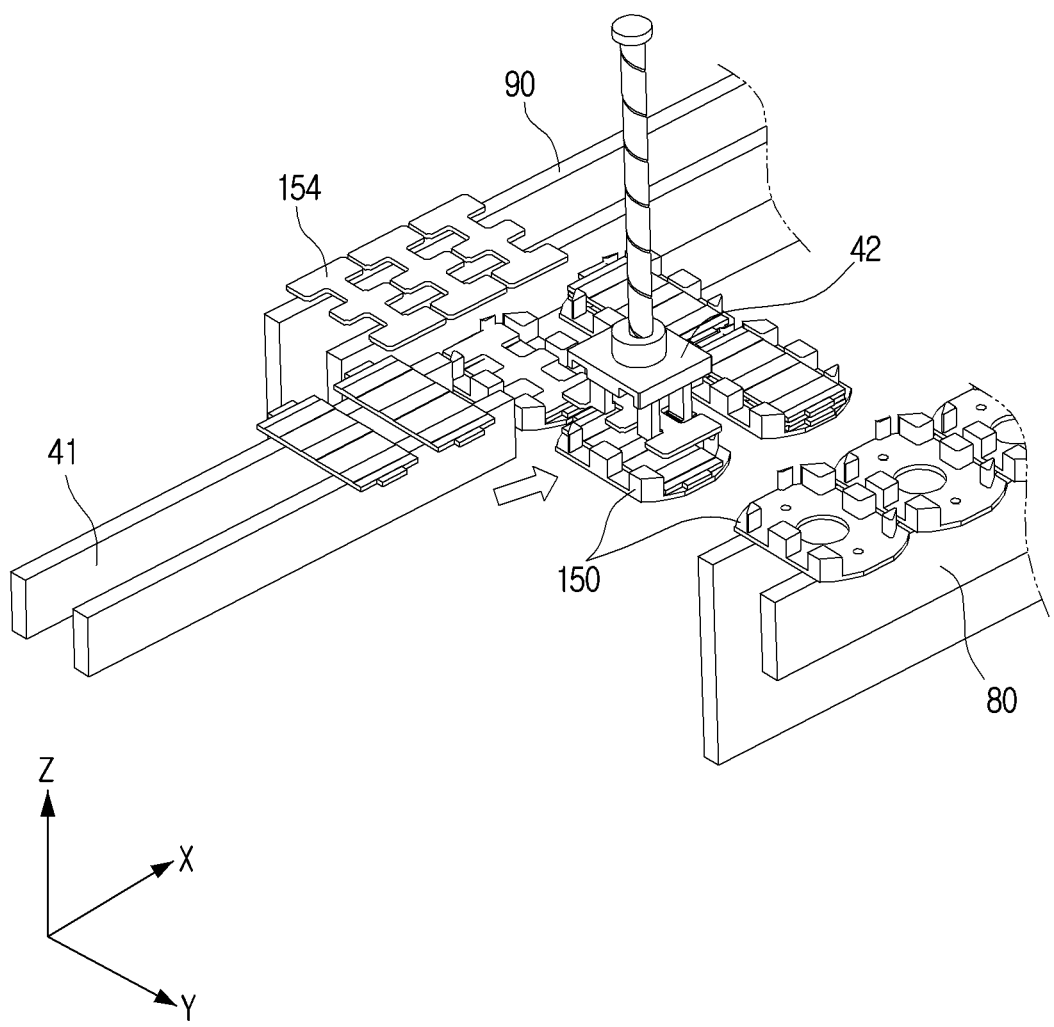
FIG. 3 is a perspective view for explaining the operation of a loading device according to an embodiment of the present disclosure.

FIGS. 2 and 3 are perspective views for explaining the operation of the loading device 40 according to an embodiment of the present disclosure.

The loading device 40 is a device for loading objects 180 to be inspected and the spacers 154 on the carriers 150.

Referring to FIG. 2, the loading device 40 may move the objects 180 to be inspected supplied from the outside through the supply line 41 to load on the carriers 150. For example, the supply line 41 may be connected to an object to be inspected production line and supply the objects 180 to be inspected produced in the object to be inspected production line to the X-ray inspection system 1.

The loading device 40 may include a gripper 42 capable of gripping and moving the objects 180 to be inspected. For example, the loading device 40 may fix the objects 180 to be inspected to the gripper 42 by applying pressure to the side surfaces of the objects 180 to be inspected through a plurality of protrusions 43 protruding from the gripper 42 and may lift the objects 180 to be inspected or move positions of the objects 180 to be inspected.

However, the structure of the loading device 40 is not limited thereto, and may be implemented in various structures capable of moving the objects 180 to be inspected.

Referring to FIG. 3, the loading device 40 may drive the gripper 42 to load the objects 180 to be inspected and the spacers 154 on the carrier 150 disposed adjacent to the supply line 41 and the spacer collecting device 90.

In this case, the carriers 150 loading the objects 180 to be inspected and the spacers 154 may be supplied from the carrier collecting device 80. Although not shown in FIG. 3, a configuration moving the carrier 150 may be disposed between the carrier collecting device 80 and the loading device 40. For example, a diverter conveyor may be disposed between the carrier collecting device 80 and the loading device 40, or the carriers 150 may be moved through a linear motion system (LMS), a magnet motion, a multi carrier system (MCS) or another linear actuator. Accordingly, the carriers 150 may be moved to a position on which the loading device 40 loads the objects 180 to be inspected and the spacers 154.

Meanwhile, the carriers 150 may be arranged in two rows at the loading position. In this case, the loading device 40 may load the objects 180 to be inspected and the spacers 154 on the respective carriers 150.

A detailed description of the operation in which the carrier collecting device 80 and the spacer collecting device 90 respectively collect and circulate the carriers 150 and the spacers 154 in the X-ray inspection system 1 will be given below with reference to FIG. 19.

The loading device 40 may take out the objects 180 to be inspected from the supply line 41 and load the objects 180 to be inspected on the carriers 150, and take out the spacer 154 from the spacer collecting device 90 and load the spacers 154 on the carriers 150.

Hereinafter, a structure in which the objects 180 to be inspected and the spacers 154 are loaded on the carriers 150 by the loading device 40 will be described with reference to FIG. 4.

Figure 4:
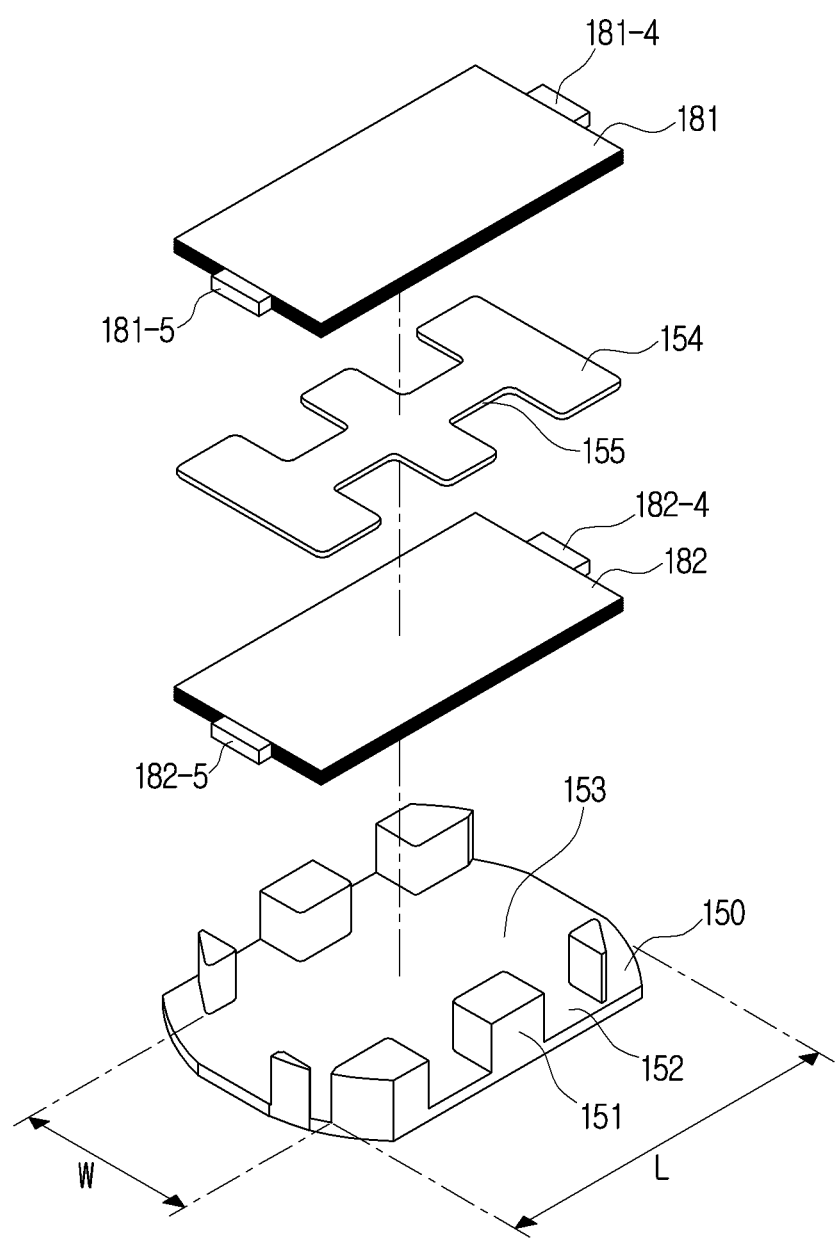
FIG. 4 is a view for explaining a configuration in which an object to be inspected and a spacer are accommodated in a carrier according to an embodiment of the present disclosure.

FIG. 4 is a view for explaining a configuration in which objects to be inspected and a spacer are accommodated in a carrier according to an embodiment of the present disclosure.

The carrier 150 may include an accommodation portion 153 which is a space in which one or more objects 181 and 182 to be inspected and the spacer 154 may be disposed and a side wall 151 including at least one groove 152.

A plurality of objects 181 and 182 to be inspected may be loaded on the carrier 150. In this case, the spacer 154 may be disposed between the objects 181 and 182 to be inspected to separate the plurality of object 181 and 182 to be inspected. As the spacer 154 is disposed between the objects 181 and 182 to be inspected, images of the objects 181 and 182 to be inspected may be distinguished from X-ray inspection images obtained with respect to the plurality of objects 181 and 182 to be inspected.

In this case, the loading device 40 may load the objects 181 and 182 to be inspected and the spacer 154 on the carrier 150 by sequentially loading the first object 182 to be inspected on the carrier 150, loading the spacer 154 thereon, and loading the second object 181 to be inspected thereon.

The spacer 154 may be separated from the transfer device 100 and may be reused while circulating in the X-ray inspection system 1.

Figure 5:
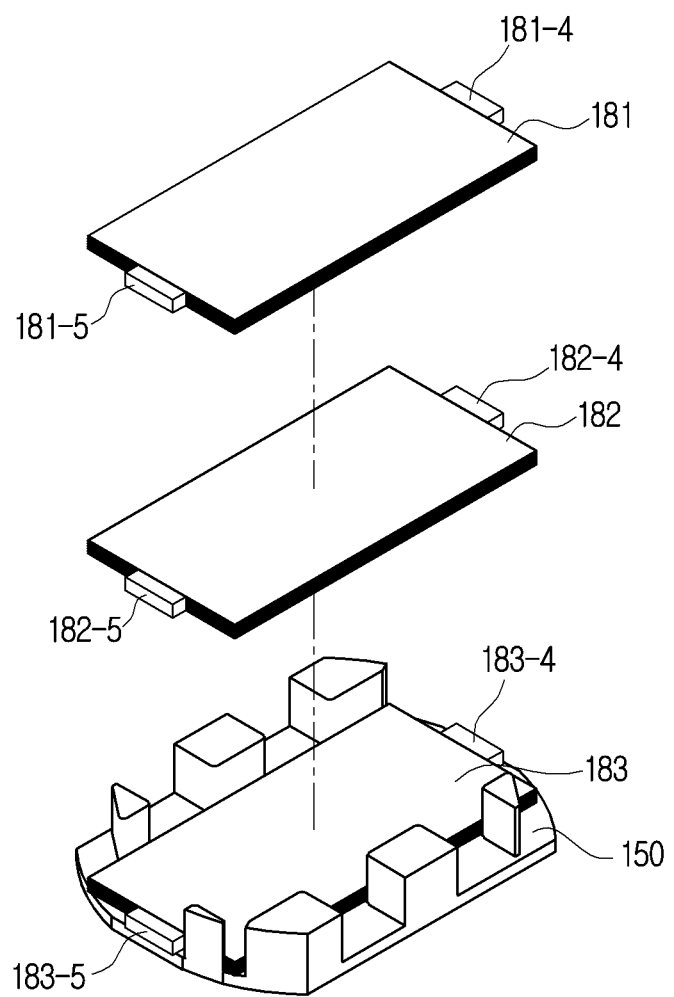
FIG. 5 is a view for explaining a configuration in which only an object to be inspected is accommodated in a carrier according to an embodiment of the present disclosure.

However, the spacer 154 does not correspond to an indispensable configuration for image discrimination with respect to the objects 181 and 182 to be inspected, and when the spacer 154 is not used, the X-ray inspection device 10 may identify each object to be inspected through the shape appearing on an X-ray inspection image, or separate and recognize each object to be inspected by calculating the number of electrodes through the size of the shape appearing on the X-ray inspection image. In this case, as shown in FIG. 5, a plurality of objects 181, 182, and 183 to be inspected may be sequentially loaded on the carrier 150. Accordingly, a larger number of objects to be inspected may be loaded on the carrier 150 compared to the case of using the spacer 154.

Meanwhile, FIG. 4 shows that two objects 181 and 182 to be inspected and one spacer 154 are accommodated in the carrier 150, but the number of objects to be inspected and spacers 154 loaded on the carrier 150 is not limited thereto.

For example, three or more objects to be inspected may be accommodated in the carrier 150, and the spacers 154 may be disposed between the objects to be inspected.

On the other hand, a length L and a width W of the accommodation portion 153 of the carrier 150 may be changeable according to types of the objects to be inspected accommodated in the carrier 150. In this case, the same X-ray inspection system 1 may be used to perform an X-ray inspection on various types of objects to be inspected, by applying the carrier 150 having the length L and the width W corresponding to the size of the objects to be inspected to the X-ray inspection system 1.

In addition, the carrier 150 may have a structure in which the arrangement of the sidewalls 151 is changeable. In this case, various types of objects to be inspected may be accommodated by changing the arrangement of the sidewalls 151 of the carrier 150 and changing the length L and width W of the accommodation portion 153.

Hereinafter, the first transport device 20 loading the carrier 150 on which the objects 180 to be inspected and the spacer 154 are loaded onto the transfer device 100 will be described with reference to FIGS. 6 to 8.

Figure 6:
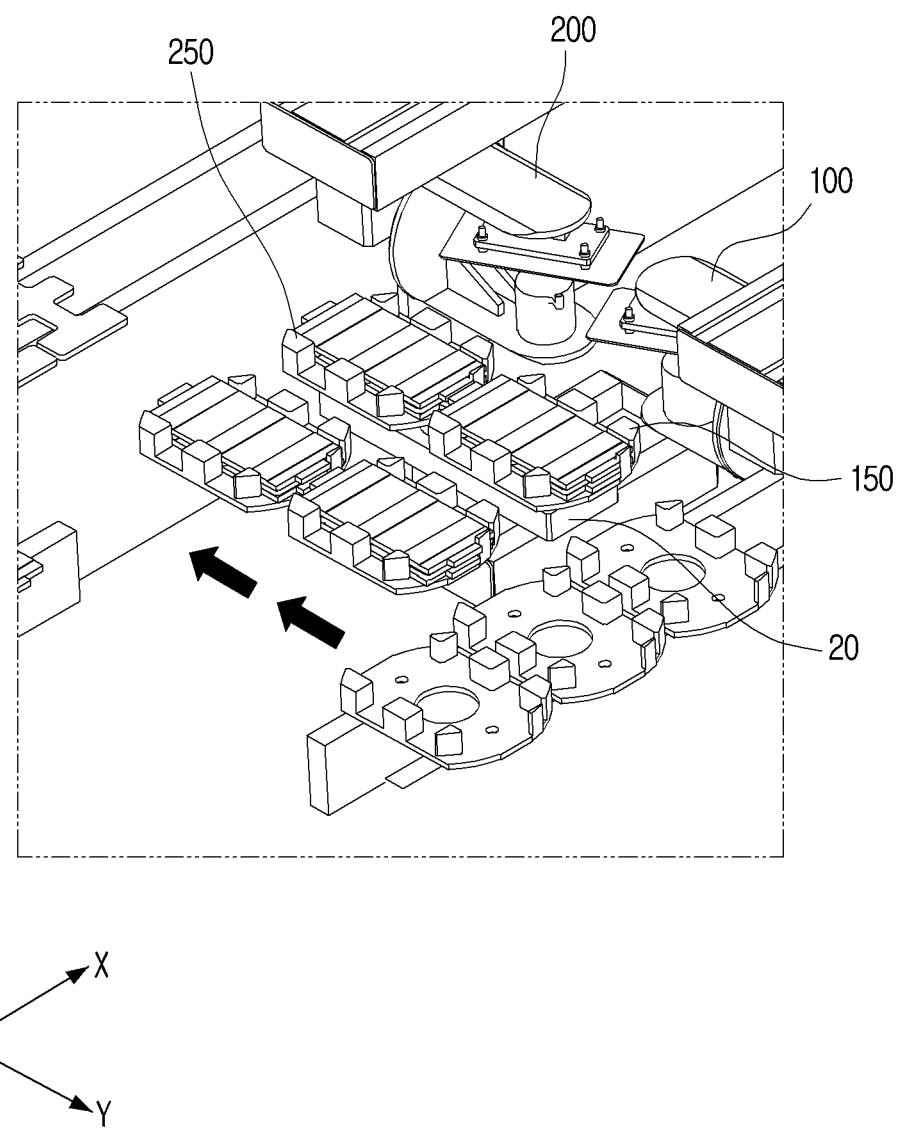
FIG. 6 is a perspective view for explaining the operation of a first transport device according to an embodiment of the present disclosure.
Figure 7:
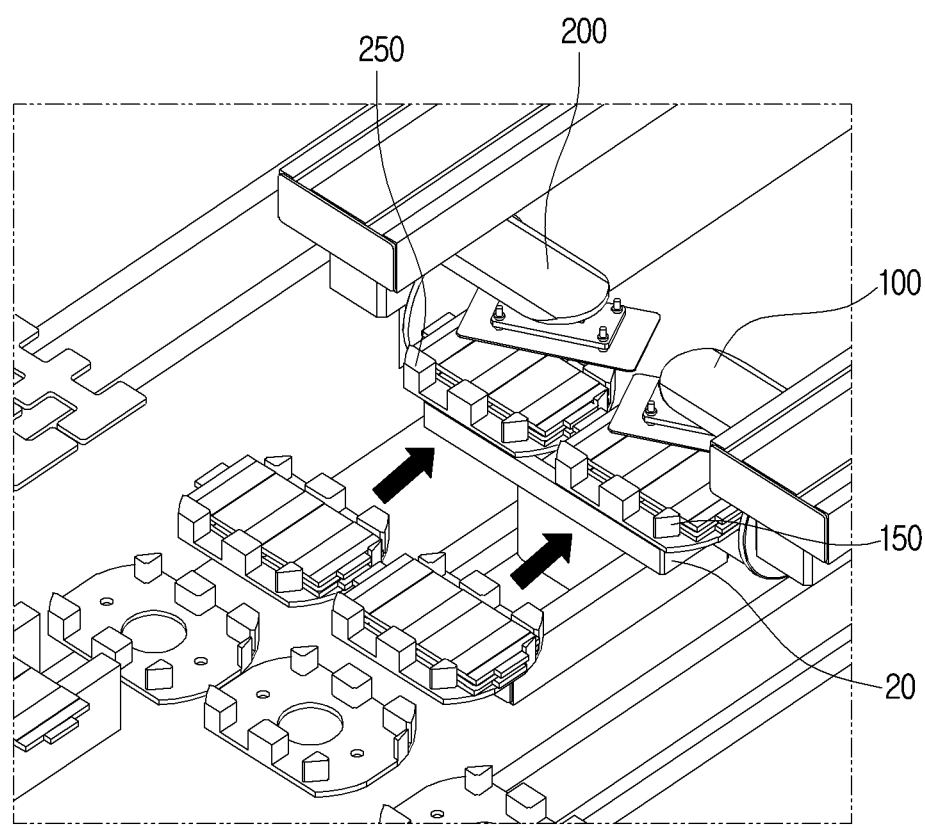
FIG. 7 is a perspective view for explaining the operation of a first transport device according to an embodiment of the present disclosure.
Figure 8:
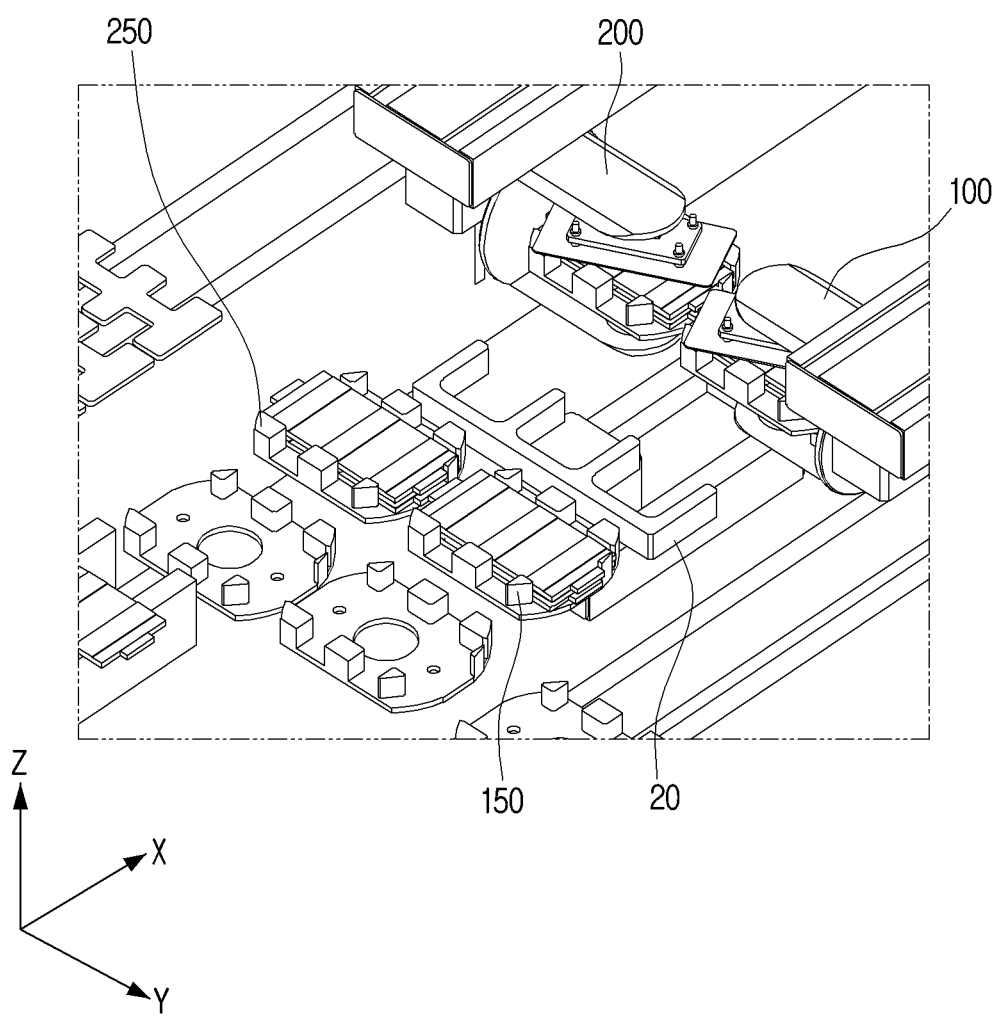
FIG. 8 is a perspective view for explaining the operation of a first transport device according to an embodiment of the present disclosure.

FIGS. 6 to 8 are perspective views for explaining the operation of the first transport device 20 according to an embodiment of the present disclosure.

Referring to FIG. 6, the first transport device 20 may move the carriers 150 and 250 loaded with objects to be inspected by the loading device 40 to the transfer devices 100 and 200, and may load the carriers 150 and 250 on the transfer devices 100 and 200.

For example, referring to FIG. 7, the first transport device 20 may move in a +X-axis direction with the carriers 150 and 250 loaded on the upper portion thereof and load the carriers 150 and 250 on the transfer devices 100 and 200.

In this case, the first transport device 20 may simultaneously transport the two carriers 150 and 250 arranged in two rows, and respectively load the carriers 150 and 250 on the first transfer device 100 and the second transfer device 200.

Meanwhile, referring to FIG. 8, the first transport device 20 may load carriers on the transfer devices 100 and 200, move in a −X-axis direction, and load the carriers 150 and 250 to be transported in the next order.

Meanwhile, it has been described above that the first transport device 20 moves the carrier 150 on which the objects 180 to be inspected and the spacer 154 are loaded, but is not limited thereto, and the first transport device 20 may be implemented in the form of directly transporting the objects 180 to be inspected without the carrier 150 and loading the objects 180 to be inspected on the transfer devices 100 and 200.

Figure 9:
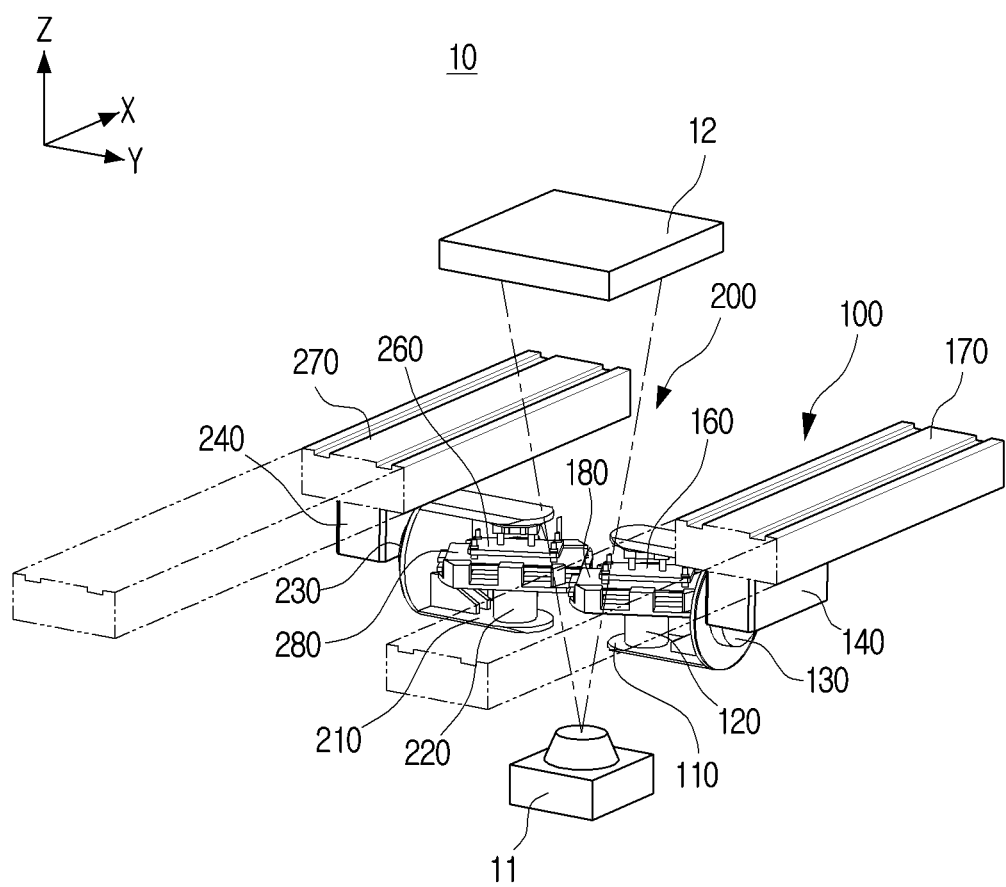
FIG. 9 is a perspective view schematically illustrating an X-ray inspection device according to an embodiment of the present disclosure.

FIG. 9 is a perspective view schematically illustrating an X-ray inspection device according to an embodiment of the present disclosure.

Referring to FIG. 9, an X-ray inspection device 10 may include the X-ray tube 11, the detector 12, and the transfer devices 100 and 200.

The X-ray inspection device 10 is a device that inspects the internal state of an object to be inspected by using the property that X-rays pass through the object. The object to be inspected by the X-ray inspection device 10 may be an electronic component such as a secondary battery, but is not limited thereto.

Referring to FIG. 9, the X-ray tube 11 may emit X-rays in a preset direction, and the detector 12 may be disposed to face the X-ray tube 11. For example, the X-ray tube 11 may emit X-rays in a +Z-axis direction, and the detector 12 may be disposed on the upper portion of the X-ray tube 11 to receive X-rays emitted from the X-ray tube 11. However, the arrangement of the X-ray tube 11 and the X-ray radiation direction are not limited thereto, and X-rays may be emitted in various directions, and the position of the X-ray tube 11 may be moved or the X-ray radiation direction may be adjusted.

The transfer devices 100 and 200 may transfer objects 180 and 280 to be inspected so that the objects 180 and 280 to be inspected are disposed in an X-ray radiation path of the X-ray tube 11.

The transfer devices 100 and 200 may include the first transfer device 100 and the second transfer device 200. The first transfer device 100 and the second transfer device 200 may respectively transfer stages 110 and 120 on which at least one object to be inspected is disposed, and the stages 110 and 120 may be simultaneously transferred by the first transfer device 100 and the second transfer device 200, respectively. Accordingly, a plurality of objects to be inspected may be simultaneously inspected using one X-ray tube 11.

The first transfer device 100 and the second transfer device 200 are symmetrically disposed and may move in parallel with each other. The first transfer device 100 and the second transfer device 200 may have the same structure.

The transfer devices 100 and 200 may include the stages 110 and 210 on which the objects 180 and 280 to be inspected are disposed, transfer members 140 and 240 connected to the stages 110 and 210, and transfer lines 170 and 270.

Referring to FIG. 9, the transfer lines 170 and 270 may be disposed in the X-axis direction. The transfer members 140 and 240 may be connected to the transfer lines 170 and 270 so as to be movable along the respective transfer lines 170 and 270.

In this case, the transfer members 140 and 240 may be connected to the stages 110 and 210 on which the objects 180 and 280 to be inspected are disposed. Accordingly, the transfer members 140 and 240 may transfer the stages 110 and 210 in the +X-axis direction so that the objects 180 and 280 to be inspected disposed on the stages 110 and 210 may be disposed on the X-ray radiation path of the X-ray tube 11.

A detailed description of operations in which the transfer devices 100 and 200 transfer the stages 110 and 210 will be given below with reference to FIGS. 11 to 13.

On the other hand, the transfer devices 100 and 200 may include first rotation members 120 and 220 rotating the objects 180 and 280 to be inspected disposed on the stages 110 and 210 in a direction parallel to the X-ray radiation path of the X-ray tube 11 as an axis, and second rotation members 130 and 230 rotating the objects 180 and 280 to be inspected in a horizontal direction perpendicular to the X-ray radiation path and the transfer direction of the stages 110 and 210 as an axis.

The first rotation members 120 and 220 may be disposed on the stages 110 and 210. The objects 180 and 280 to be inspected may be disposed on the first rotation members 120 and 220 and may rotate by the rotation of the first rotation members 120 and 220.

For example, referring to FIG. 8, the first rotation members 120 and 220 may rotate in the Z-axis direction as an axis. Accordingly, the objects 180 and 280 to be inspected may rotate so that any one of corners thereof is disposed in the X-ray radiation path of the X-ray tube 11.

However, the arrangement of the stages 110 and 210, the first rotation members 120 and 220, and the objects 180 and 280 to be inspected is not limited thereto, and may be implemented in the form in which an object to be inspected is disposed on a stage, and the object to be inspected and a part of the stage on which the object to be inspected is disposed rotate by a first rotation member.

The second rotation members 130 and 230 may rotate in a horizontal direction perpendicular to the X-ray radiation path and the transfer direction of the stages 110 and 210 as an axis.

For example, referring to FIG. 8, the second rotation members 130 and 230 may be connected to the side surfaces of the stages 110 and 210, and may rotate the stages 110 and 210, the first rotation members 120 and 220 and the objects 180 and 280 to be inspected disposed on the stages 110 and 210 in the Y-axis direction as an axis.

In this case, the second rotation members 130 and 230 may rotate by a certain angle or more or by 360 degrees or more in the Y-axis direction. For example, the second rotation members 130 and 230 may rotate by 180 degrees or more, and may rotate by an angle smaller than 180 degrees as long as an inspection image may be obtained. In addition, in order to obtain a high quality 3D inspection image, the second rotation members 130 and 230 may be rotated by an angle of 360 degrees or more, preferably about 370 degrees. Accordingly, the detector 12 may generate a 3D inspection image by obtaining an X-ray inspection image transmitted through the object to be inspected in various directions.

A detailed description of rotation operations of the first and second rotation members 120 and 220 and the second rotation members 130 and 230 and generation of inspection image accordingly will be given below.

Figure 10:
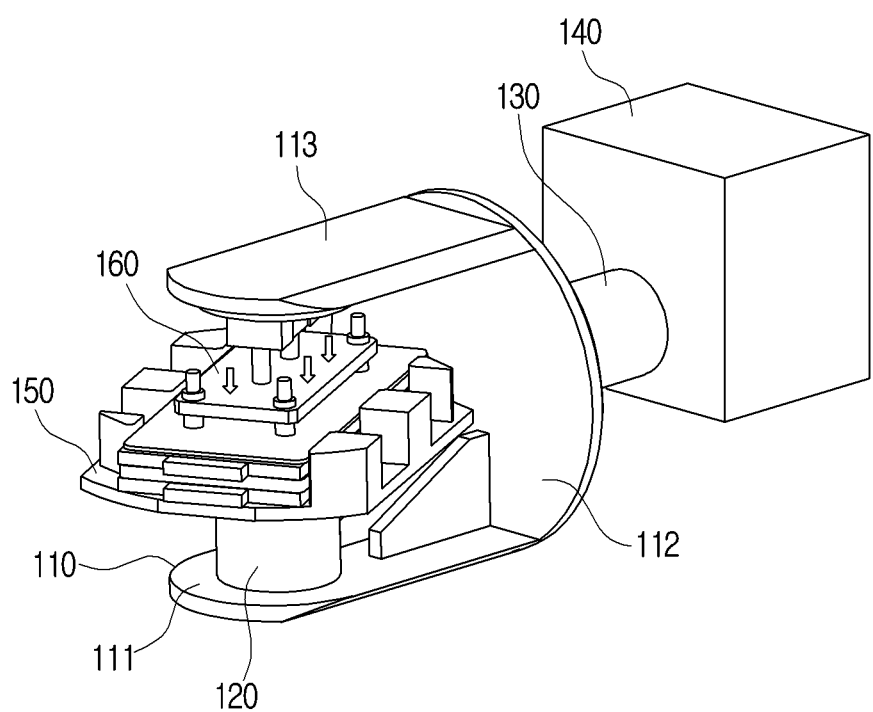
FIG. 10 is a perspective view for explaining a transfer device according to an embodiment of the present disclosure.

FIG. 10 is a perspective view for explaining a transfer device according to an embodiment of the present disclosure.

Hereinafter, for convenience of description, the structure of the first transfer device 100 will be described as an example. The description of the first transfer device 100 may also be applied to the second transfer device 200.

The transfer device 100 may include the stage 110, the first rotation member 120, the second rotation member 130, the transfer member 140, the carrier 150 and a fixing member 160.

Referring to FIG. 10, the stage 110 may include a side plate 112, a lower plate 111 extending and forming in a horizontal direction at the lower end of the side plate 112, and an upper plate 113 extending and forming in a horizontal direction at the upper end of the side plate 112.

The first rotation member 120 may be rotatably disposed on the lower plate 111 of the stage 110.

The object 180 to be inspected may be disposed on the first rotation member 120. In this case, the object 180 to be inspected may be disposed on the first rotation member 120 while being accommodated in the carrier 150 having a space for accommodating the object 180 to be inspected.

The carrier 150 may be separated from the transfer device 100 and may be reused while circulating in the X-ray inspection system 1. The carrier 150 may allow the at least one object 180 to be inspected to be transferred by the transfer device 100 in a way in which the at least one object 180 to be inspected are loaded on the transfer device 100 through the first transport device 20 while accommodating the at least one object 180 to be inspected.

The fixing member 160 may be disposed to contact the upper portion of the object 180 to be inspected and may have a vertically movable structure. For example, the fixing member 160 may be connected to the upper plate 113 of the stage 110 and disposed to contact the upper portion of the object 180 to be inspected disposed on the lower plate 111 and the first rotation member 120. In this case, the fixing member 160 may fix the object 180 to be inspected to the stage 110 by moving to come into contact with the upper portion of the object 180 to be inspected after the object 180 to be inspected is disposed on the stage 110.

Accordingly, while the stage 110 rotates by the first rotation member 120 and the second rotation member 130 or is transferred by the transfer member 140, the fixing member 160 may fix the object 180 to be inspected so as to be disposed on the stage 110, thereby preventing the object 180 to be inspected from being separated from the stage 110 during the inspection.

Figure 11:
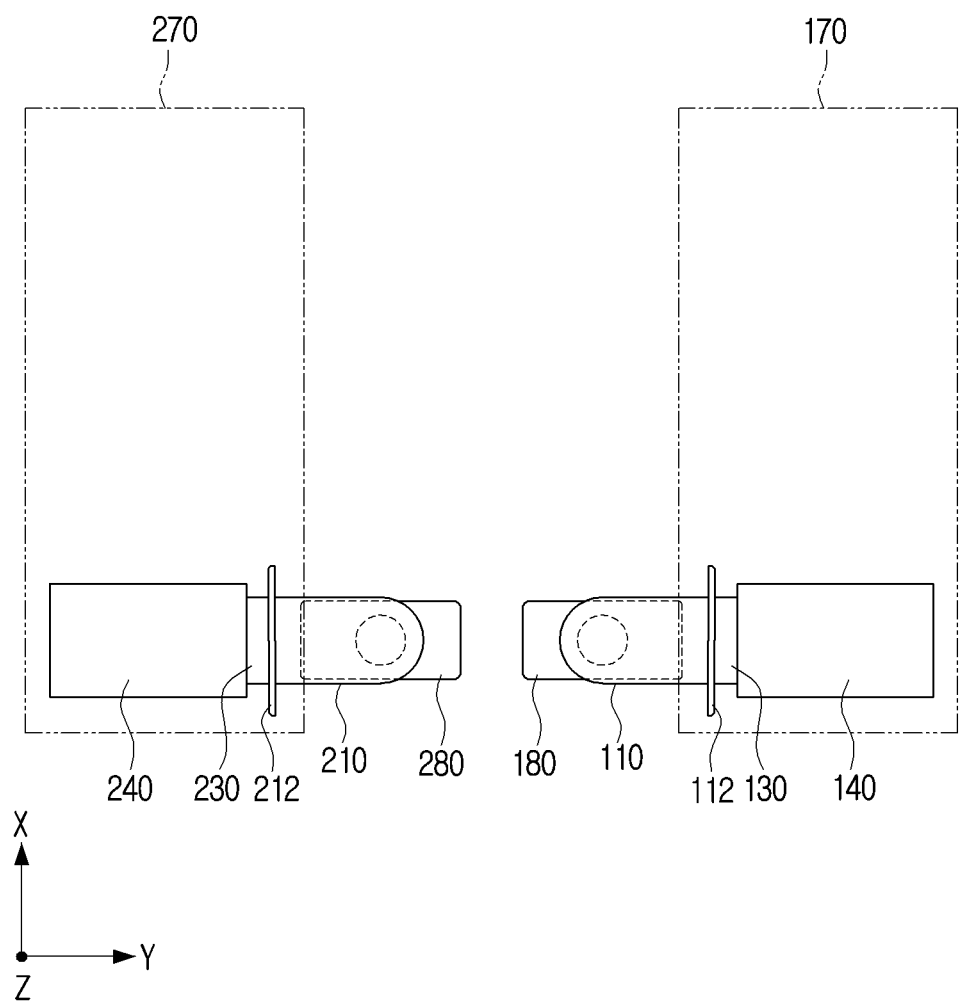
FIG. 11 is a diagram for explaining an operation of a transfer device according to an embodiment of the present disclosure.
Figure 12:
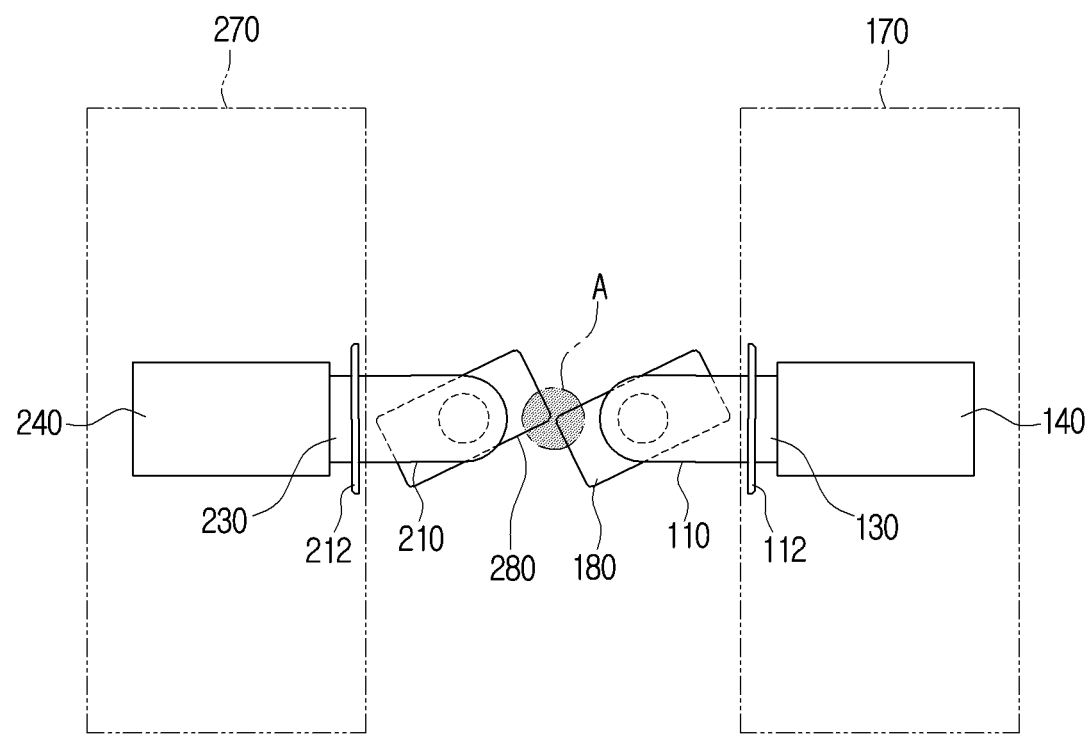
FIG. 12 is a diagram for explaining an operation of a transfer device according to an embodiment of the present disclosure.
Figure 13:
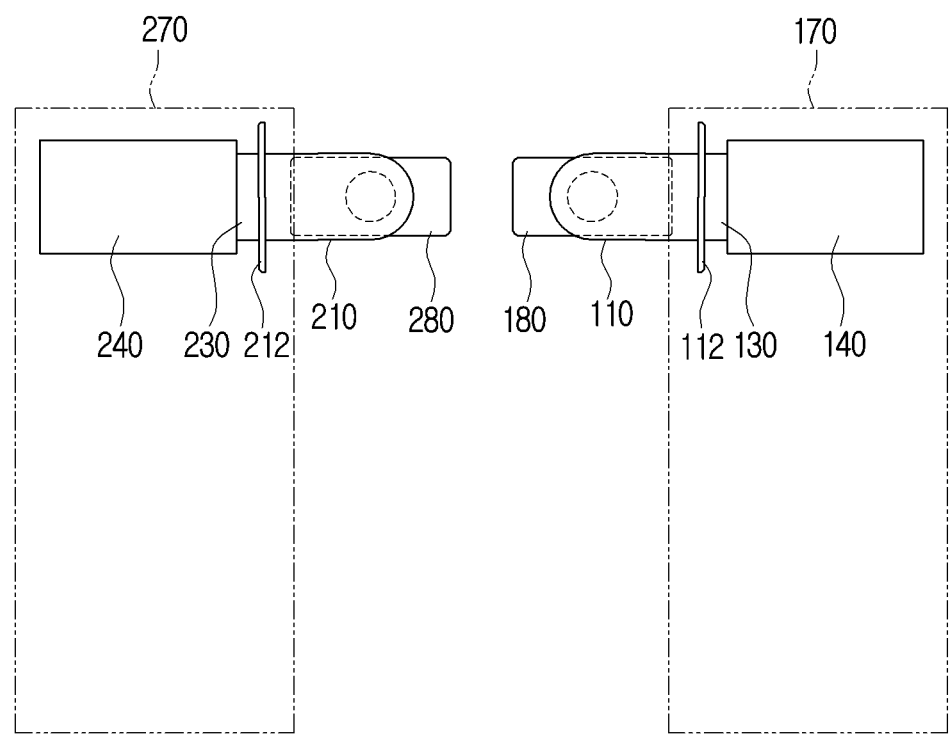

FIGS. 11 to 13 are diagrams for explaining the operation of a transfer device according to an embodiment of the present disclosure.

FIGS. 11 to 13 are views of the transfer devices 100 and 200 according to an embodiment of the present disclosure in the Z-axis direction, and unnecessary configurations for explaining the operation of transferring the objects 180 and 280 to be inspected are omitted.

FIG. 11 is a view showing a state in which the stages 110 and 210 are disposed at positions where the objects 180 and 280 to be inspected are loaded on the stages 110 and 210 of the transfer devices 100 and 200.

Although not shown in FIG. 11, the objects 180 and 280 to be inspected may be loaded on the stages 110 and 210 while being accommodated in the carriers 150 and 250, respectively. This loading operation may be performed by the first transport device 20 disposed at the start point of a transfer path of the transfer devices 100 and 200.

FIG. 12 is a view showing a state in which the stages 110 and 210 are disposed at positions where an X-ray inspection is performed on the objects 180 and 280 to be inspected.

The transfer members 140 and 240 may transfer the stages 110 and 210 in the +X-axis direction from a position (see FIG. 11) where the objects 180 and 280 to be inspected are loaded. However, the configuration for transferring the objects 180 and 280 to be inspected in the +X-axis direction is not limited thereto, and the objects 180 and 280 to be inspected may be transferred by the first and second transfer devices 20 and 30 (see FIG. 27) in the +X-axis direction. A detailed description in this regard will be given below with reference to FIG. 27.

Referring to FIG. 12, some areas of the objects 180 and 280 to be inspected may be disposed on an inspection position A. For example, the first rotation members 120 and 220 may rotate the objects 180 and 280 to be inspected in the Z-axis direction so that any one of corners of the objects 180 and 280 to be inspected is disposed at the inspection position A.

Accordingly, the object 180 to be inspected transferred by the first transfer device 100 and the object 280 to be inspected transferred by the second transfer device 200 may be inspected simultaneously using X-rays emitted from one X-ray tube 11.

In addition, as the objects 180 and 280 to be inspected rotate by the first rotation members 120 and 220, the X-ray inspection may be performed by disposing corner regions of the objects 180 and 280 to be inspected at the inspection position A.

In addition, as the objects 180 and 280 to be inspected rotate by the first rotation members 120 and 220, the X-ray inspection may be performed by disposing corner regions or side surfaces of the objects 180 and 280 to be inspected at the inspection position A.

For example, when the objects 180 and 280 to be inspected are secondary batteries, by obtaining three-dimensional (3D) inspection images of partial regions of the objects 180 and 280 to be inspected, for example, the corner regions, it is possible to measure a level difference and a degree of bending of negative electrodes and positive electrodes of the secondary batteries, and through this, it is possible to determine whether the objects to be inspected are defective.

In addition, it is possible to determine whether the objects to be inspected are defective by determining states of terminals 180-4, 180-5, 280-4, and 280-5 (see FIG. 15) disposed on the side surfaces of the objects 180 and 280 to be inspected through the inspection image obtained with respect to the side surfaces of the objects 180 and 280 to be inspected, for example, a welding state of a terminal, etc.

Meanwhile, although not shown in FIG. 12, the transfer devices 100 and 200 may include a horizontal moving member (not shown) that moves the stages 110 and 210 in a horizontal direction perpendicular to the transfer direction, that is, in the Y-axis direction. Accordingly, it is possible to move the objects 180 and 280 to be inspected so as to be closer to the inspection position A.

For example, referring to FIG. 12, the horizontal moving member of the first transfer device 100 may move the stage 110 in the −Y axis direction, and the horizontal moving member of the second transfer device 200 may move the stage 210 in the +Y axis direction.

The horizontal movement member may be a separate component connected to the stages 110 and 210, but may be implemented to have the same effect so that the transfer members 140 and 240 are configured to be movable in the horizontal direction while connected to the stages 110 and 210.

FIG. 13 is a view showing a state in which the stages 110 and 210 of the transfer devices 100 and 200 are disposed at positions where the objects 180 and 280 to be inspected are moved from the stages 110 and 210.

Although not shown in FIG. 13, the objects 180 and 280 to be inspected may be moved from the stages 110 and 210 while being accommodated in the carriers 150 and 250, respectively. This moving operation may be performed by the second transport device 30 disposed at the end point of the transfer path of the transfer devices 100 and 200.

In this case, the second transport device 30 may move the carriers 150 and 250 loaded with the objects 180 and 280 to be inspected to the classification device 50. A detailed description of an operation in which the second transport device 30 moves the carriers 150 and 250 will be described below with reference to FIGS. 22 and 23.

FIGS. 14 and 15 are views for explaining a secondary battery inspection operation of the X-ray inspection device according to an embodiment of the present disclosure.

Specifically, an X-ray inspection operation of inspecting the objects 180 and 280 to be inspected in various directions by an operation in which the transfer device 100 and 200 rotate the second rotation member 130 and 230 will be described with reference to FIGS. 14 and 15.

FIG. 14 is a view of some configurations of the transfer devices 100 and 200 as viewed from the X-axis direction, and for convenience of explanation, only the X-ray tube 11, the detector 12, and the objects 180 and 280 to be inspected are briefly shown.

FIG. 15 is a view showing a state in which the objects 180 and 280 to be inspected rotate by 90 degrees in the Y-axis direction by the second rotation members 130 and 230 in the configuration of FIG. 14.

Referring to FIGS. 12 and 13, the objects 180 and 280 to be inspected may rotate by the second rotation members 130 and 230 (see FIG. 9) by 360 degrees in the Y-axis direction as an axis while being disposed on an X-ray radiation path of the X-ray tube 11. Accordingly, the detector 12 may obtain X-ray inspection images transmitted through the objects 180 and 280 in various directions and generate a 3D inspection image of one side of the objects 180 and 280 to be inspected.

On the other hand, when the X-ray inspection on any one of the corners or side surfaces of each of the objects 180 and 280 to be inspected is completed by the second rotation members 130 and 230, the objects 180 and 280 to be inspected may rotate by the first rotation members 120 and 220 with respect to the Z-axis direction. Accordingly, the X-ray inspection may be sequentially performed on the corners or side regions of the objects 180 and 280 to be inspected where the X-ray inspection is not performed.

When the objects 180 and 280 to be inspected have rectangular shapes, the X-ray inspection may be performed on all four corners, and only two corners disposed diagonally to each other may be inspected.

For example, the objects 180 and 280 to be inspected may rotate by the first rotation members 120 and 220 by 180 degrees in the Z-axis direction as an axis and then, rotate by the second rotation members 130 and 230 by 360 degrees in the Y-axis direction as an axis, and thus, the X-ray inspection device 10 may perform the X-ray inspection on the corner or side region opposite to the regions of the objects 180 and 280 to be inspected on which the inspection is performed.

Meanwhile, the X-ray inspection device according to the present disclosure may be implemented to include one or more detectors.

FIG. 16 is a diagram for explaining an inspection operation of an X-ray inspection device including a plurality of detectors.

Referring to FIG. 16, the X-ray inspection device may include the X-ray tube 11 and a plurality of detectors 12-1 and 12-2, and the X-ray tube 11 may emit X-rays to each of the detectors 12-1 and 12-2.

The transfer devices 100 and 200 may transfer the objects to be inspected to an inspection position located in the respective X-ray radiation paths. For example, the transfer device 100 may transfer the object 180 to be inspected to a first inspection position located on a path along which X-rays are emitted from the X-ray tube 11 toward the first detector 12-1, and at the same time, the transfer device 200 may transfer the object 280 to be inspected to a second inspection position located on a path along which X-rays are emitted from the X-ray tube 11 toward the second detector 12-2.

In this case, each of the objects 180 and 280 to be inspected may rotate while being disposed on the X-ray radiation path of the X-ray tube 11. Accordingly, each of the detectors 12-1 and 12-2 may obtain X-ray inspection images transmitted through the objects 180 and 280 to be inspected in various directions, and generate a 3D inspection image of the objects 180 and 280 to be inspected.

FIGS. 17 to 19 are views for explaining another inspection operation of an X-ray inspection device according to an embodiment of the present disclosure.

Referring to FIG. 17, the transfer devices 100 and 200 may rotate the objects 180 and 280 to be inspected so that the side surfaces of the objects 180 and 280 to be inspected are disposed in perpendicular to the X-ray radiation path, and then transfer the objects 180 and 280 to be inspected to an inspection position. Accordingly, the X-ray inspection device 10 may obtain a 2D inspection image of the objects 180 and 280 to be inspected instead of a 3D inspection image.

FIG. 18 is a side view for explaining an area detecting method among 2D inspection methods of an X-ray inspection device according to an embodiment of the present disclosure, and FIG. 19 is a side view for explaining a line detecting method among 2D inspection methods of an X-ray inspection device according to an embodiment of the present disclosure.

Referring to FIG. 18, all side regions of the object 180 to be inspected may be disposed in an X-ray radiation path of the X-ray tube 11, that is, an inspection position. In this case, the X-ray inspection device 10 may obtain a 2D inspection image of the side surface region of the object 180 to be inspected.

Meanwhile, referring to FIG. 19, a part of the side surface region of the object 180 to be inspected may be disposed in the X-ray radiation path of the X-ray tube 11, that is, the inspection position. In this case, according to the movement of the object 180 to be inspected by the transfer device 100 or the position movement of the X-ray tube 11 and the detector 12, an X-ray inspection may be performed on all of the side surface areas of the object 180 to be inspected, and accordingly, the X-ray inspection device 10 may obtain a 2D inspection image of the side surface areas of the object 180 to be inspected.

FIGS. 20 to 21 are diagrams for explaining a secondary battery inspection operation of an X-ray inspection device according to an embodiment of the present disclosure.

FIG. 20 is a diagram schematically illustrating a 3D inspection image of a corner region of the object 180 to be inspected that may be generated by the X-ray inspection device 10 when the object 180 to be inspected is a secondary battery.

Referring to FIG. 20, the 3D inspection image of the object 180 to be inspected may include a 3D inspection image of a positive electrode 180-1, a negative electrode 180-2, and a separator 180-3 separating the positive electrode 180-1 and the negative electrode 180-2.

The X-ray inspection device 10 may analyze the 3D inspection image of the object 180 to be inspected to identify whether the object 180 to be inspected is defective.

For example, the X-ray inspection device 10 may measure the alignment state, quantity, and a degree of bending of each of the positive electrode 180-1 and the negative electrode 180-2 through the 3D inspection image, identify whether the object 180 to be inspected is within a normal range, and based on an identification result, classify the object 180 to be inspected into a non-defective or defective product.

Furthermore, the X-ray inspection device 10 may generate a cutting surface of the 3D inspection image and measure the degree of bending of each of the positive electrode 180-1 and the negative electrode 180-2 and a level difference between the positive electrode 180-1 and the negative electrode 180-2 to determine whether the object 180 to be inspected is defective.

Specifically, referring to FIG. 21, the X-ray inspection device 10 may generate cutting surfaces respectively cut along lines I-I and II-II with respect to the 3D inspection image of the object 180 to be inspected. In this case, the X-ray inspection device 10 may measure level differences D1 and D2 between the positive electrode 180-1 and the negative electrode 180-2 corresponding to respective cutting directions.

Meanwhile, the X-ray inspection device 10 according to an embodiment of the present disclosure may convert a 3D inspection image into a 2D image to perform an inspection or may capture a 2D inspection image instead of a 3D image.

FIGS. 22 to 23 are perspective views for explaining the operation of the second transport device 30 according to an embodiment of the present disclosure.

Referring to FIG. 22, the second transport device 30 may move the carriers 150 and 250 on which objects to be inspected on which the X-ray inspection has been completed are loaded from the transfer devices 100 and 200. In this case, the second transport device 30 may move the carriers 150 and 250 to the classification device 50 (see FIG. 24).

For example, referring to FIGS. 22 and 23, the second transport device 30 may move to lower portions of the carriers 150 and 250 disposed on the transfer devices 100 and 200 and move in the +X-axis direction while the carriers 150 and 250 are disposed on the upper portion of the second transport device 30.

In this case, the second transport device 30 may simultaneously load and transport the two carriers 150 and 250 respectively disposed on the first transfer device 100 and the second transport device 200.

On the other hand, it has been described above that the second transport device 30 moves the carrier 150 on which the objects 180 to be inspected and the spacer 154 are loaded, but is not limited thereto, the second transport device 30 may be implemented in the form of directly receiving the object 180 to be inspected from the transfer devices 100 and 200 without the carrier 150.

FIG. 24 is a perspective view for explaining the operation of the classification device 50 according to an embodiment of the present disclosure.

Referring to FIG. 24, the classification device 50 may separate the objects 180 to be inspected and the spacers 154 loaded on the carrier 150 moved by the second transport device 30 from the carriers 150.

The classification device 50 may be implemented in various structures capable of moving the objects 180 to be inspected and the spacers 154. For example, the classification device 50 may include a shape of a gripper including a protrusion as described above in the loading device 40, but is not limited thereto.

Referring to FIG. 24, the classification device 50 may take out the objects 180 to be inspected and move the objects 180 to be inspected to the non-defective product classification line 60 or the defective product classification line 70, and take out the spacers 154 to move the spacers 154 to the spacer collecting device 90.

Meanwhile, the empty carrier 150 from which the objects 180 to be inspected and the spacers 154 are taken out may move to the carrier collecting device 80. Although not shown in FIG. 19, a diverter conveyor may be disposed between a position where the carrier 150 is transported by the second transport device 30 and the carrier collecting device 80. Accordingly, the carrier 150 may move to the carrier collecting device 80.

The carrier collecting device 80 may move the collected carrier 150 to the position of the first transport device 20, and the spacer collecting device 90 may move the collected spacers 154 to the position of the loading device 40. In this case, the loading device 40 may load a new object to be inspected and the collected spacers 154 on the collected carrier 150. Accordingly, the carrier 150 and the spacers 154 may be reused while circulating in the X-ray inspection system 1.

On the other hand, the classification device 50 may classify and take out the object 180 to be inspected into a line corresponding to an X-ray inspection result of the object 180 to be inspected on which the X-ray inspection has been completed based on the X-ray inspection result.

The X-ray inspection device 10 may generate an X-ray inspection image of an object to be inspected based on X-rays received through the detector 12, and determine whether the object to be inspected is defective based on the X-ray inspection image.

For example, when the object to be inspected is a secondary battery, the X-ray inspection device 10 may analyze the 3D inspection image generated of the corner region of the object to be inspected and measure the alignment state, quantity, and a degree of bending of each of positive and negative electrodes to identify whether the object to be inspected is within the normal range, and classify the object to be inspected into a non-defective product or a defective product based on an identification result.

Based on the X-ray inspection image, the classification device 50 may arrange objects 180$a$ to be inspected identified as non-defective products on the non-defective product classification line 60, and arrange objects 180$b$ to be inspected identified as defective products on the defective product classification line 70.

FIG. 25 is a diagram for explaining a transfer device according to another embodiment of the present disclosure.

Referring to FIG. 25, transfer devices 300 and 400 according to another embodiment of the present disclosure may be articulated robots capable of gripping and transferring objects to be inspected and rotating the objects to be inspected through a plurality of joints.

In this case, the transfer devices 300 and 400 may include bases 310 and 410 having fixed positions, a plurality of links 311, 312, 313, 314, 315, 411, 412, 413, 414, and 415 sequentially connected, a plurality of joints 321, 322, 323, 324, 325, 326, 421, 422, 423, 424, 425, and 426 disposed on the respective connection parts, and wrist portions 330 and 430 for gripping objects 380 and 480 to be inspected.

The first joints 321 and 421 may connect the bases 310 and 410 and the first links 311 and 411, and the first links 311 and 411 may be connected to rotate on the bases 310 and 410. The second joints 322 and 422 may connect the second links 312 and 412 to rotate with respect to the first links 311 and 411, the third joints 323 and 423 may connect the third links 313 and 413 to rotate with respect to the second links 312 and 412, and the fourth joints 324 and 424 may connect the fifth links 315 and 415 to rotate with respect to the fourth links 314 and 414.

Meanwhile, the fifth joints 325 and 425 may connect the wrist portions 330 and 430 to rotate with respect to the fifth links 315 and 415, and the sixth joints 326 and 426 may connect the wrist portions 330 and 430 to rotate with respect to the fifth links 315 and 415 about an axis different from the fifth joints 325 and 425.

Each of the joints 321, 322, 323, 324, 325, 326, 421, 422, 423, 424, 425, and 426 may perform a rotational motion by receiving a driving force through a motor (not shown).

The wrist portions 330 and 430 may include grippers 331 and 431 for griping the objects 380 and 480 to be inspected.

Accordingly, the transfer devices 300 and 400 may perform a series of operations of transferring the objects 380 and 480 to be inspected from the supply line 41 to an inspection position between the X-ray tube 11 and the detector 12, rotating the objects 380 and 480 to be inspected in various directions, and arranging the objects 380 and 480 to be inspected in the non-defective product classification line 60 or the defective product classification line 70 according to inspection results.

FIG. 26 is a diagram for explaining an inspection operation of an X-ray inspection device including a transfer device according to another embodiment of the present disclosure.

FIG. 26 illustrates a state in which three objects 380, 480, and 580 to be inspected are simultaneously disposed on the inspection position A. In this case, the transfer device may include a first transfer device, a second transfer device, and a third transfer device respectively transferring the objects 380, 480, and 580 to be inspected. Each of the first to third transfer devices may be an articulated robot as shown in FIG. 20.

Referring to FIG. 26, the gripper 311 included in the wrist portion 310 of the first transfer device, the gripper 411 included in the wrist portion 410 of the second transfer device, and the gripper 511 included in the wrist portion 510 of the third transfer device may respectively grip the objects 380, 480, and 580 to be inspected, and transfer partial regions of the objects 380, 480, and 580 to be inspected so as to be disposed on the inspection position A. In this case, side surface regions of the objects 380, 480, and 580 to be inspected may be disposed at the inspection position A, and corner regions of the objects 380, 480, and 580 to be inspected may be disposed at the inspection position A.

Accordingly, a plurality of objects 380, 480, and 580 to be inspected transferred by the first to third transfer devices may be simultaneously inspected using X-rays emitted from one X-ray tube 11.

FIG. 26 shows that three objects 380, 480, and 580 are simultaneously disposed at the inspection position A, but the number of objects to be inspected disposed at the inspection position A is not limited thereto, and the transfer device may simultaneously inspect four or more objects to be inspected by varying angles at which the objects to be inspected are disposed and an X-ray radiation area at the inspection position.

FIG. 27 is a perspective view illustrating an X-ray inspection system according to another embodiment of the present disclosure.

Referring to FIG. 27, the X-ray inspection system may transfer objects to be inspected in the X-axis direction through first transport devices 20-1 and 20-2 and second transport devices 30-1 and 30-2.

In addition, by disposing a carrier collecting device 80-2 at a position corresponding to the spacer collecting device 90 of FIG. 1, the X-ray inspection system may be implemented so that a carrier collecting operation may be rapidly performed through the two carrier collecting devices 80-1 and 80-2.

Accordingly, it is possible to further simplify and implement the overall structure of the X-ray inspection system.

Although the preferred embodiments of the present disclosure have been shown and described above, the present disclosure is not limited to the specific embodiments described above, various modifications are possible by those skilled in the art to which the disclosure pertains without departing from the gist of the present disclosure claimed in the claims, and these modifications should not be individually understood from the technical spirit or perspective of the present disclosure.

INDUSTRIAL APPLICABILITY

The present disclosure relates to an X-ray inspection device and an X-ray inspection system including the X-ray inspection device.

The invention claimed is:

1. An X-ray inspection device comprising:
an X-ray tube;
a detector disposed to face the X-ray tube; and
transfer devices, for simultaneous X-ray inspection of at least two objects to be inspected, transferring the at least two objects to be inspected to an inspection position between the X-ray tube and the detector;
wherein the transfer devices are capable of transferring the at least two objects to be inspected in a transfer direction perpendicular to an X-ray radiation path of the X-ray tube, are rotatable with respect to the X-ray radiation path as an axis, and are rotatable in a horizontal direction perpendicular to the X-ray radiation path and the transfer direction as an axis; and
wherein the transfer devices include:
a first rotation member rotating the at least two objects to be inspected with respect to the X-ray radiation path as the axis;
a second rotation member rotating the at least two objects to be inspected and the first rotation member in the horizontal direction as an axis;
a transfer member transferring the at least two objects to be inspected, the first rotation member, and the second rotation member in the transfer direction; and
a horizontal moving member moving the at least two objects to be inspected, the first rotation member, and the second rotation member in the horizontal direction.

2. The X-ray inspection device of claim 1, wherein the transfer devices include:
a first transfer device; and
a second transfer device;
wherein each of the first and second transfer devices simultaneously transfers the at least two objects to be inspected to the inspection position.

3. The X-ray inspection device of claim 1, wherein the transfer devices further include a rotation member simultaneously rotating the at least two objects to be inspected.

4. The X-ray inspection device of claim 1, further comprising:
a carrier accommodating the at least two objects to be inspected; and
a spacer disposed between the at least two objects to be inspected when the at least two objects to be inspected are accommodated in the carrier;
wherein the transfer devices transfer the carrier to the inspection position.

5. The X-ray inspection device of claim 1, wherein:
the detector includes a first detector and a second detector;
wherein the transfer devices transfer the at least two objects to be inspected to a first inspection position between the X-ray tube and the first detector and to a second inspection position between the X-ray tube and the second detector.

6. The X-ray inspection device of claim 3, wherein the rotation member rotates the at least two objects to be inspected so that any one of corners or one of side surfaces of the at least two objects to be inspected is disposed at the inspection position.

7. An X-ray inspection system comprising:
an X-ray tube;
a detector disposed to face the X-ray tube;
at least two carriers, wherein each of the at least two carriers is capable of accommodating at least one object to be inspected;
a loading device loading the at least one object to be inspected on the at least two carriers;
a transfer device transferring the at least two carriers and the at least one object to be inspected to an inspection position between the X-ray tube and the detector; and
a carrier collecting device collecting the at least two carriers to an initial position where the at least one object to be inspected is loaded after the at least one object to be inspected on which an X-ray inspection is completed is separated from the carrier;
wherein the transfer device, for simultaneous X-ray inspection of the at least one object to be inspected respectively accommodated in the at least two carriers, transfers the at least two carriers to an inspection position between the X-ray tube and the detector;
wherein the transfer device is capable of transferring the at least one object to be inspected in a transfer direction perpendicular to an X-ray radiation path of the X-ray tube, is rotatable with respect to the X-ray radiation path as an axis, and is rotatable in a horizontal direction perpendicular to the X-ray radiation path and the transfer direction as an axis;
wherein the transfer device includes:
a first rotation member rotating the at least one object to be inspected with respect to the X-ray radiation path as the axis;
a second rotation member rotating the at least one object to be inspected and the first rotation member in the horizontal direction as an axis;
a transfer member transferring the at least one object to be inspected, the first rotation member, and the second rotation member in the transfer direction; and
a horizontal moving member moving the at least one object to be inspected, the first rotation member, and the second rotation member in the horizontal direction.

8. The X-ray inspection system of claim 7, further comprising:
a first transport device loading a carrier of the at least two carriers in which the at least one object to be inspected is accommodated on the transfer device;
a classification device classifying the at least one object to be inspected based on an X-ray inspection result of the at least one object to be inspected; and
a second transport device moving the carrier of the at least two carriers accommodating the at least one object to be inspected on which the X-ray inspection is completed from the transfer device to the classification device.

9. The X-ray inspection system of claim 8, wherein:
the detector generates an X-ray inspection image of the at least one object to be inspected;
the classification device is configured to arrange the at least one object to be inspected identified as a non-defective product on a non-defective product classification line and is configured to take out the at least one object to be inspected based on the X-ray inspection image generated with respect to the at least one object to be inspected; and
the classification device is configured to arrange the at least one object to be inspected identified as a defective product on a defective product classification line and configured to take out the at least one object to be inspected based on the X-ray inspection image generated with respect to the at least one object to be inspected.

10. The X-ray inspection system of claim 8, further comprising:
when a plurality of the at least one object to be inspected are accommodated in the carrier of the at least two carriers,
a spacer disposed between each of the at least one object to be inspected when the at least one object to be inspected is accommodated in the carrier of the at least two carriers; and
a spacer collecting device collecting the spacer,
wherein the classification device takes out the spacer loaded on the carrier of the at least two carriers to the spacer collecting device, and wherein the spacer collecting device moves the spacer to a position where the spacer is loaded on the carrier of the at least two carriers.

* * * * *